(12) United States Patent
Braun et al.

(10) Patent No.: US 12,476,663 B2
(45) Date of Patent: Nov. 18, 2025

(54) SYSTEMS AND METHODS FOR MULTI-TRANSCEIVER RADIO FREQUENCY SIGNAL PROCESSING SYSTEMS

(71) Applicant: Outdoor Wireless Networks LLC, Claremont, NC (US)

(72) Inventors: Patrick Braun, Munningen (DE); Gerhard Braun, Ederheim (DE); Rainer Friedrich, Maihingen (DE); Peter Schmid, Marxheim-Neuhausen (DE); Joerg Stefanik, Donauworth (DE); Van Erick Hanson, Forest, VA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 714 days.

(21) Appl. No.: 17/828,493

(22) Filed: May 31, 2022

(65) Prior Publication Data

US 2022/0407556 A1    Dec. 22, 2022

Related U.S. Application Data

(60) Provisional application No. 63/211,710, filed on Jun. 17, 2021.

(51) Int. Cl.
*H04B 1/40* (2015.01)
*H04B 1/00* (2006.01)
*H04B 1/04* (2006.01)

(52) U.S. Cl.
CPC ............ *H04B 1/40* (2013.01); *H04B 1/0053* (2013.01); *H04B 1/0475* (2013.01); *H04B 1/0483* (2013.01); *H04B 2001/0425* (2013.01)

(58) Field of Classification Search
CPC .......... H04B 1/0475; H04B 2001/0425; H04B 7/0617; H04B 2001/0441; H04B 1/40; H04B 1/04; H04B 1/525; H04B 1/38; H04B 2001/045; H04B 15/00; H04B 17/29; H04B 2001/0433; H04B 7/043
USPC .......................................................... 455/76
See application file for complete search history.

(56) References Cited

U.S. PATENT DOCUMENTS

| | | | |
|---|---|---|---|
| 10,615,754 B2 | 4/2020 | Braun et al. | |
| 2016/0204809 A1* | 7/2016 | Pratt | H04B 1/0475 |
| | | | 375/219 |
| 2021/0391853 A1* | 12/2021 | Jann | H03B 5/12 |

* cited by examiner

*Primary Examiner* — Ajibola A Akinyemi
(74) *Attorney, Agent, or Firm* — Fogg & Powers LLC

(57) ABSTRACT

In one embodiment, a multi-transceiver RF signal processing system comprises: a controller; a DPD core and CFR engine; and a plurality of transceiver paths comprising at least a first transceiver path for a first frequency block, and a second transceiver path for a second frequency block. The first frequency block is adjacent to the second frequency block. Signal processing outputs a stream of digital RF based on wireless RF signals received into the first and second transceiver paths. Signal processing inputs a first stream of digital RF and outputs a first digital RF signal corresponding to the first frequency block to the first transceiver path, and outputs a second digital RF signal corresponding to the second frequency block to the second transceiver path for wireless transmission via the at least one antenna. The DPD core applies a distortion that covers the first and second frequency blocks.

20 Claims, 15 Drawing Sheets

SYSTEMS AND METHODS FOR MULTI-TRANSCEIVER RADIO FREQUENCY SIGNAL PROCESSING SYSTEMS

CROSS-REFERENCE TO RELATED APPLICATIONS

This application claims the benefit of U.S. Patent Application Ser. No. 63/211,710, filed Jun. 17, 2021, and titled "SYSTEMS AND METHODS FOR MULTI-TRANSCEIVER RADIO FREQUENCY SIGNAL PROCESSING SYSTEMS," the contents of which are incorporated herein by reference.

BACKGROUND

Distributed Antenna Systems (DAS) and off-air repeater systems are often used to improve the coverage of wireless base stations by extending the coverage area provided by the base station, and for avoiding structures that contribute to penetration losses. The wireless service provided by the base stations can include commercial cellular service and/or private or public safety wireless communications. The demand for high data rates in mobile communication calls for the support of very wide frequency bands by these DAS and repeater systems. The 3rd Generation Partnership Project (3GPP) 5G technology standard for broadband cellular networks allows network operators to fulfill these data rate needs using high carrier bandwidth and accordingly broadband operating bands. For example, in Europe, a DAS or repeater system may be expected to support both of the adjacent 3GPP B42 (3400-3600 MHz) and B43 (3600-3800 MHz) frequency bands. In the United States, a DAS or repeater system may be expected to support similarly broad passbands such as the Citizens Broadband Radio Service (CBRS) C-band that operates from 3550-3980 Mhz. However, a challenge that emerges is in implementing the Digital Pre-distortion (DPD) utilized for efficient operation of transmitters while meeting linearity requirements as current transmitters with integrated DPD cores implemented in Field Programmable Gate Arrays (FPGAs) are unable to fulfill such high bandwidth needs.

SUMMARY

In one embodiment, a multi-transceiver radio frequency (RF) signal processing system comprises: a controller configured to execute signal processing for multiple transceiver paths; a digital pre-distortion (DPD) core and crest factor reduction (CFR) engine; and a plurality of transceiver paths coupled to the controller, the plurality of transceiver paths comprising at least a first transceiver path for a first frequency block, and a second transceiver path for a second frequency block, wherein the first frequency block is adjacent to the second frequency block at a border frequency; wherein the signal processing executed by the controller is configured to output a stream of digital RF data based on wireless RF signals received into the first transceiver path and into the second transceiver path; wherein the signal processing executed by the controller is configured to input a first stream of digital RF data and output a first digital RF signal corresponding to the first frequency block to the first transceiver path for wireless transmission via at least one antenna, and output a second digital RF signal corresponding to the second frequency block to the second transceiver path for wireless transmission via the at least one antenna; and wherein the DPD core applies a distortion to the first digital RF signal and the second digital RF signal that covers the first frequency block and the second frequency block.

DRAWINGS

FIGS. 9, 9A, 9B and 9C each illustrate example embodiments of a distributed antenna system (DAS) comprising a multi-transceiver radio frequency signal processing system.

Figure 10:
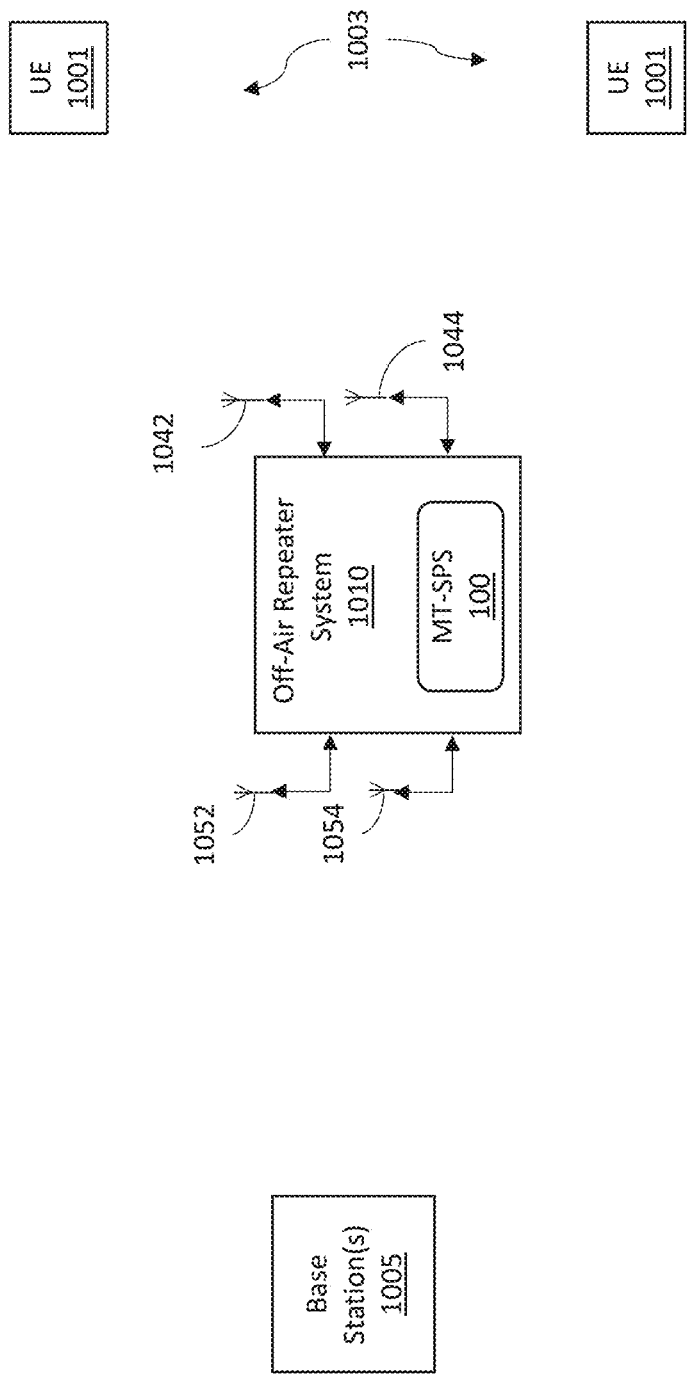
Figure 10A:
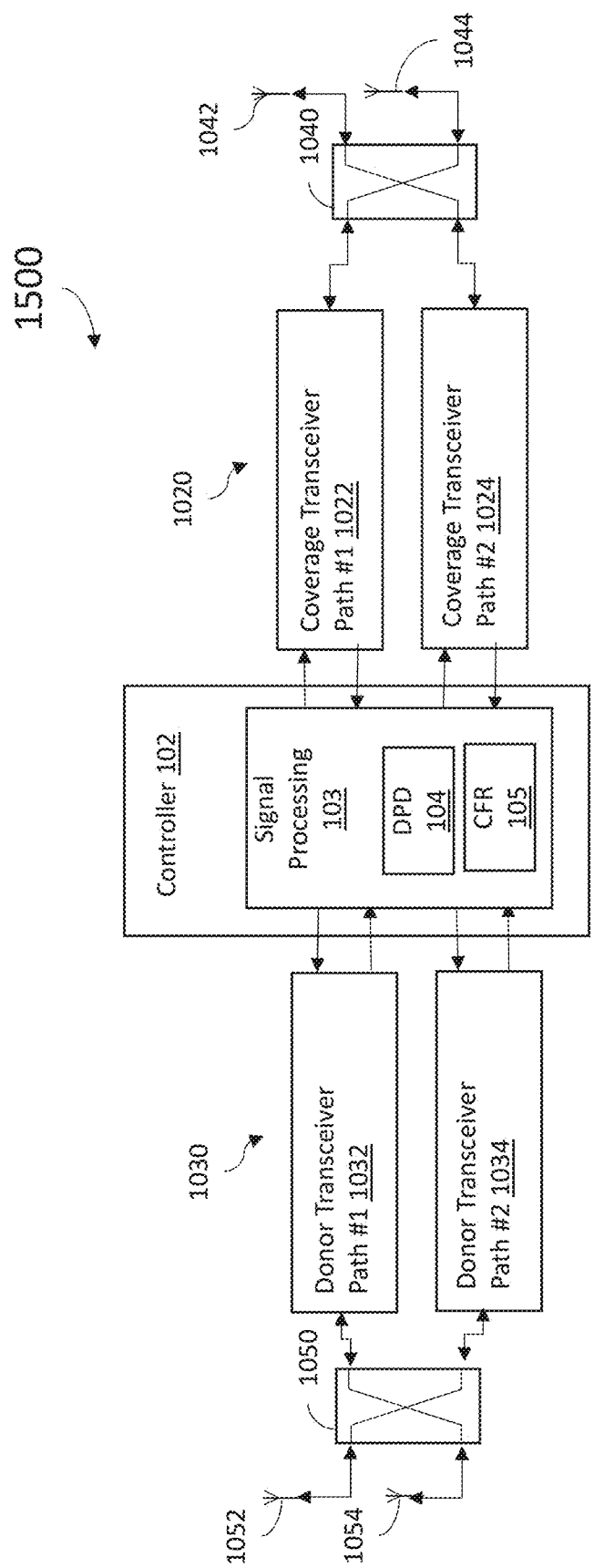

FIGS. 10 and 10A illustrate example embodiments of an off-air repeater system comprising a multi-transceiver radio frequency signal processing system.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide system and methods for Distributed Antenna Systems (DAS), off-air repeater systems, and other radio frequency transceiver equipment that need to operate with very wide frequency bands. As described below, these embodiments include multi-transceiver radio frequency (RF) signal processing systems that combine separate transceiver paths operating in parallel to provide a unified signal path for transporting signals falling within a wide contiguous spectrum of RF signal bandwidths.

Moreover these multi-transceiver systems can provide DPD across the full spectrum of the RF bandwidth through either flexible bandwidth settings and/or calibrations to correct misalignments of phase and amplitude across border frequencies.

Figure 1:
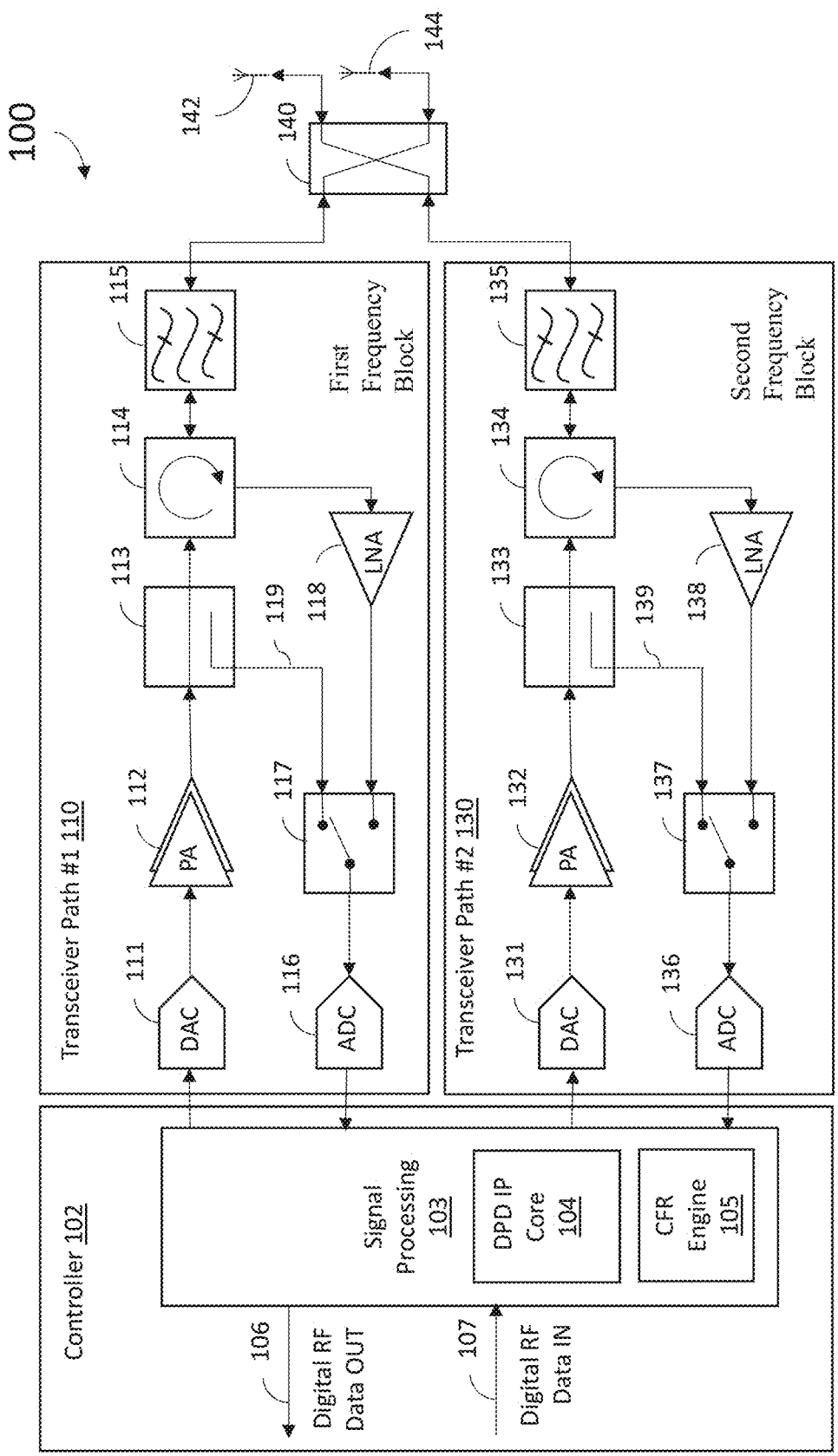
FIG. 1 is a block diagram illustrating an example multi-transceiver radio frequency signal processing system embodiment.

FIG. 1 is a diagram illustrating a multi-transceiver radio frequency (RF) signal processing system (MT-SPS) 100 comprises a plurality of transceiver paths. Each transceiver path is configured to transport uplink and downlink RF signals in a respective RF frequency band. In the embodiment shown in FIG. 1, the MT-SPS 100 comprises a first transceiver path 110 and a second transceiver path 130, each coupled to a controller 102. The controller 102 may be implemented using a processor or other programmable device coupled to a memory, or other processing technology such as a field programmable gate array (FPGA) or application specific integrated circuit (ASIC), programmed to execute signal processing 103 on RF signals transported by multiple transceiver paths (such as the first transceiver path 110 and second transceiver path 130), execute code for a DPD core 104 (which may also be referred to as a DPD IP core) comprising one or more DPD engines, a Crest Factor Reduction (CFR) engine 105, and execute code to perform other functions attributed to the controller 102 as described herein. Although FIG. 1 illustrates a MT-SPS 100 comprising a pair of transceiver paths (110 and 130), it should be understood that in other embodiments, the MT-SPS 100 may operate with three or more transceiver paths. In should be appreciated that in some embodiments, the DPD core and CFR engine may both be implemented in the same code.

In this embodiment, the first transceiver path 110 and the second transceiver path 130 operate in parallel to provide a collective signal path for transporting signals falling within a contiguous spectrum of RF signal bandwidth. That is, the first transceiver path 110 is configured to process a first frequency block while the second transceiver path 130 is configured to process a second frequency block that is adjacent to the first frequency block. With embodiments of the present disclosure, the first transceiver path 110 and the second transceiver path 130 are tuned and calibrated to function as a single transceiver path covering the combined spectrum of the first frequency block and the second frequency block.

In one example embodiment, the first transceiver path 110 transports the European 3GPP 200 MHz band B42 (3400-3600 MHz) and the second transceiver path 130 transports the European 3GPP 200 MHz band B43 (3600-3800 MHz). The combined signal path of such an MT-SPS 100 would be a 400 MHz band from 3400-3800 MHz, with a border frequency of 3600 MHz that falls within the operating band of both the first transceiver path 110 and the second transceiver path 130. In another example embodiment, the first transceiver path 110 and the second transceiver path 130 each carry adjacent portions of the same band. For example, in the United States, the Citizens Broadband Radio Service (CBRS) C-band operates from 3550-3980 MHz. In that case the first transceiver path 110 may transport a first portion of the C-band (e.g., 3550-3765) while the second transceiver path 130 transports an adjacent second porting of the C-band (e.g. 3765-3980 MHz). The combined signal path of such an MT-SPS 100 would be a 430 MHz band from 3550-3980 MHz, with a border frequency of 3765 MHz that falls within the operating band of both the first transceiver path 110 and the second transceiver path 130.

In the embodiment shown in FIG. 1, the first transceiver path 110 comprises a transmit path that includes a digital-to-analog converter 111, a power amplifier 112, a signal coupler 113, a signal isolator 114 (such as a 3-port circulator, for example) and an RF band filter 115. The first transceiver path 110 also comprises a receive path that includes an analog-to-digital converter 116, an RF switch 117 and a low noise amplifier 118 that is coupled to the signal isolator. The signal isolator 114 is coupled to one or more antenna 142, 144 (via a hybrid 140 further discussed below) and functions to pass RF signals from the transmit path to the one or more antenna 142, 144 for wireless transmission, and to pass wireless RF signals received by the one or more antenna 142, 144 to the receive path, while providing isolation (i.e., a high degree of attenuation) that attenuates signals passing between the transmit path and the receive path. It should be understood that a 3-port circulator is mentioned as an example signal isolator 114. In some embodiments, the signal isolator 114 may instead comprise a single pole double throw (SPDT) switch or a combination of one or more circulators and switches to improve isolation and attenuate or prevent high power signals entering the receive path from the transmit path.

In receiving mode operation, the RF switch 117 couples the LNA 118 to the ADC 116. Wireless RF signals receive by the one or more antenna 142, 144 passes through the filter 115 which is configured to filter out components of signals falling outside the frequency block of the first transceiver path 110. The filtered signal is passed by the signal isolator 114 to the LNA 118 and the resulting amplified signal is digitized by the ADC 116 into a digital RF signal for input to the controller 102. The digital RF signals is processed by the signal processing 103 and output from the controller 102 as a stream of digital RF data output 106. In transmitting mode operation, the controller 102 receives a stream of digital RF data input 107. The digital RF data input 107 is processed by the signal processing 103 which outputs a portion corresponding to the first frequency block as a digital RF signal to the DAC 111. The DAC 111 converts the digital RF signal to an analog RF signal. The PA 112 amplifies the analog signal to a power level for transmission and the signal isolator 114 passes the signal for wireless transmission by the one or more antenna 142, 144 (via the filter 115, to filter out components of the signal falling outside the frequency block of the first transceiver path 110). For the embodiment shown in FIG. 1, while in transmit mode, the RF switch 117 is switched to couple the signal coupler 113 to the ADC 116 (instead of coupling the LNA 118 to the ADC 116). That is, the signal coupler 113 couples a portion of transmitted signal as amplified by the PA 112 back to the ADC 116 for conversion into a digital observation feedback signal for input to the controller 102. This alignment provides an observation feedback path 119 back to the DPD IP core 104 for performing DPD as discussed below.

In the embodiment shown in FIG. 1, the second transceiver path 130 is essentially equivalent in structure and function to the first transceiver path 110. The second transceiver path 130 comprises a transmit path that includes a digital-to-analog converter 131, a power amplifier 132, a signal coupler 133, a signal isolator 134 (such as a 3-port circulator, for example) and an RF band filter 135. The second transceiver path 130 also comprises a receive path that includes an analog-to-digital converter 136, an RF switch 137 and a low noise amplifier 138 that is coupled to the signal isolator 134. The signal isolator 134 is coupled to the same one or more antenna 142, 144 (via the hybrid 140 further discussed below). The signal isolator 134 passes RF signals from the transmit path to the one or more antenna 142, 144 for wireless transmission, and passes wireless RF signals received by the one or more antenna 142, 144 to the receive path, while providing isolation (i.e., a high degree of attenuation) that attenuates signals passing between the transmit path and the receive path. In some embodiments, the signal isolator 134 may instead comprise a single pole double throw (SPDT) switch or a combination of one or more circulators and switches to improve isolation and attenuate or prevent high power signals entering the receive path from the transmit path.

In receiving mode operation, the RF switch 137 couples the LNA 138 to the ADC 136. Wireless RF signals received by the one or more antenna 142, 144 are passed through the filter 135 which is configured to filter out components of signals falling outside the frequency block of the second transceiver path 130. The filtered signal is passed by the signal isolator 134 to the LNA 138 and the resulting amplified signal is digitized by the ADC 136 into a digital RF signal for input to the controller 102. The received digital RF signal is processed by the signal processing 103 and output from the controller as part of the digital RF data output 106. In transmitting mode operation, the controller 102 receives digital RF data input 107, which is processed by the signal processing 103 and outputs a portion corresponding to the second frequency block as a digital RF signal to the DAC 131, which converts the digital RF signal to an analog RF signal. The PA 132 amplifies the analog signal to a power level for transmission and the signal isolator 134 passes the signal for wireless transmission by the one or more antenna 142, 144 (via the filter 135, to filter out components of the signal falling outside the frequency block of the second transceiver path 130). For the embodiment shown in FIG. 1, while in transmit mode, the RF switch 137 is switched to couple the signal coupler 133 to the ADC 136 (instead of coupling the LNA 138 to the ADC 136). That is, the signal coupler 133 couples a portion of transmitted signal as amplified by the PA 132 back to the ADC 136 for conversion into a digital observation feedback signal for input to the controller 102. This alignment provides an observation feedback path 139 back to the DPD IP core 104 for performing DPD.

PA 112 and PA 132 amplify the analog signal they input, but also introduce distortions because of the intrinsic non-linearities of these amplifiers. An effective approach to linearizing an amplifier to compensate for nonlinearities is to digitally pre-distort the signal that is to be transmitted utilizing DPD (Digital Pre-Distortion). To implement DPD for the MT-SPS 100, the DPD IP core 104 comprises an inverse model of the nonlinear transfer characteristics of the respective power amplifiers for each the plurality of transceiver paths. The signals to be transmitted by the transceiver paths 110 and 130 are digitally pre-distorted by the DPD IP core 104 applying the inverse models to a digital version of the respective signals prior to their conversion to an analog signal and amplification. That is, an inverse model of the PA 112 is applied by the DPD IP core 104 to the digital transmit signal for the first frequency block and provided to the DAC 111 of transceiver path 110, and an inverse model of the PA 132 is applied by the DPD IP core 104 to the digital transmit signal for the first frequency block and provided to the DAC 131 of transceiver path 130. Applying the inverse model to the digital version of the transmit signal carried by each transceiver path 110, 130 pre-distorts the transmit signal in a manner that is intended to be equal to and opposite from the distortion introduced during amplification by the respective PA 112, PA 132 so that in the resulting final amplified signals applied to the antenna 142, 144, any distortion is minimized below an allowed level.

To account for variations in the transfer characteristics of the power amplifiers, the inverse model used by DPD IP core 104 is updated based on a real-time monitoring of the amplifier analog RF output signals utilizing the observation feedback signals 119 and 139. The DACs 111 and 131, when the transceiver paths 110, 130 are operating in transmit mode, are configured to convert to digital baseband data the corresponding analog coupled RF observation feedback signal received via the observation feedback paths 119, 139. The baseband data for each is output to the DPD IP core 104 for processing for updating the inverse model associated with each power amplifier. In some embodiments, coefficients used to implement the inverse models of the nonlinear transfer characteristics of each power amplifier are updated based on the difference between the undistorted digital version of the transmit signal and the digital coupled signal output from the power amplifier.

Figure 1A:
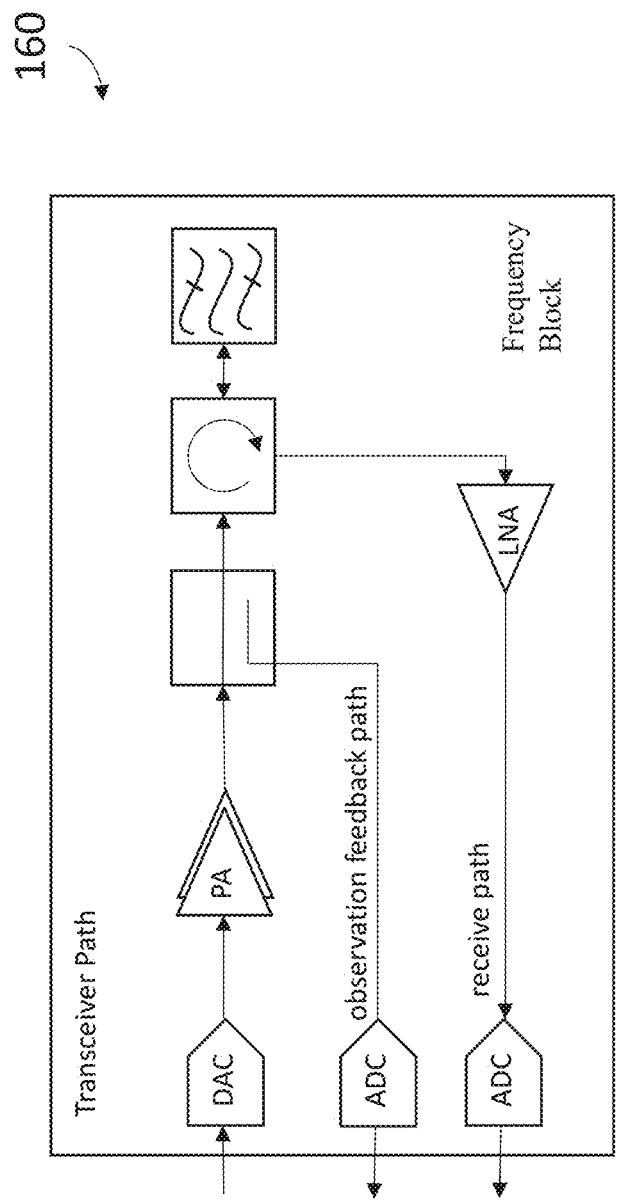
FIG. 1A is a block diagram illustrating an example transceiver path with separate receive and observation feedback paths.

It is to be understood that the transceiver architecture of the first transceiver path 110 and second transceiver path 130 can be implemented in other ways. In the embodiment of FIG. 1, the ADCs 116 and 136 are dual purpose, serving as the receive path analog-to-digital converters when operating in receive mode, and serving as the observation feedback path analog-to-digital converters when operating in transmit mode. In other embodiments, each of the transceiver paths 110, 130 can instead comprise a dedicated analog-to-digital converter for the receive path, and a separate analog-to-digital converter for the observation feedback path, eliminating the RF switches 117 and 137 (as shown in FIG. 1A at 160)

Figure 2:
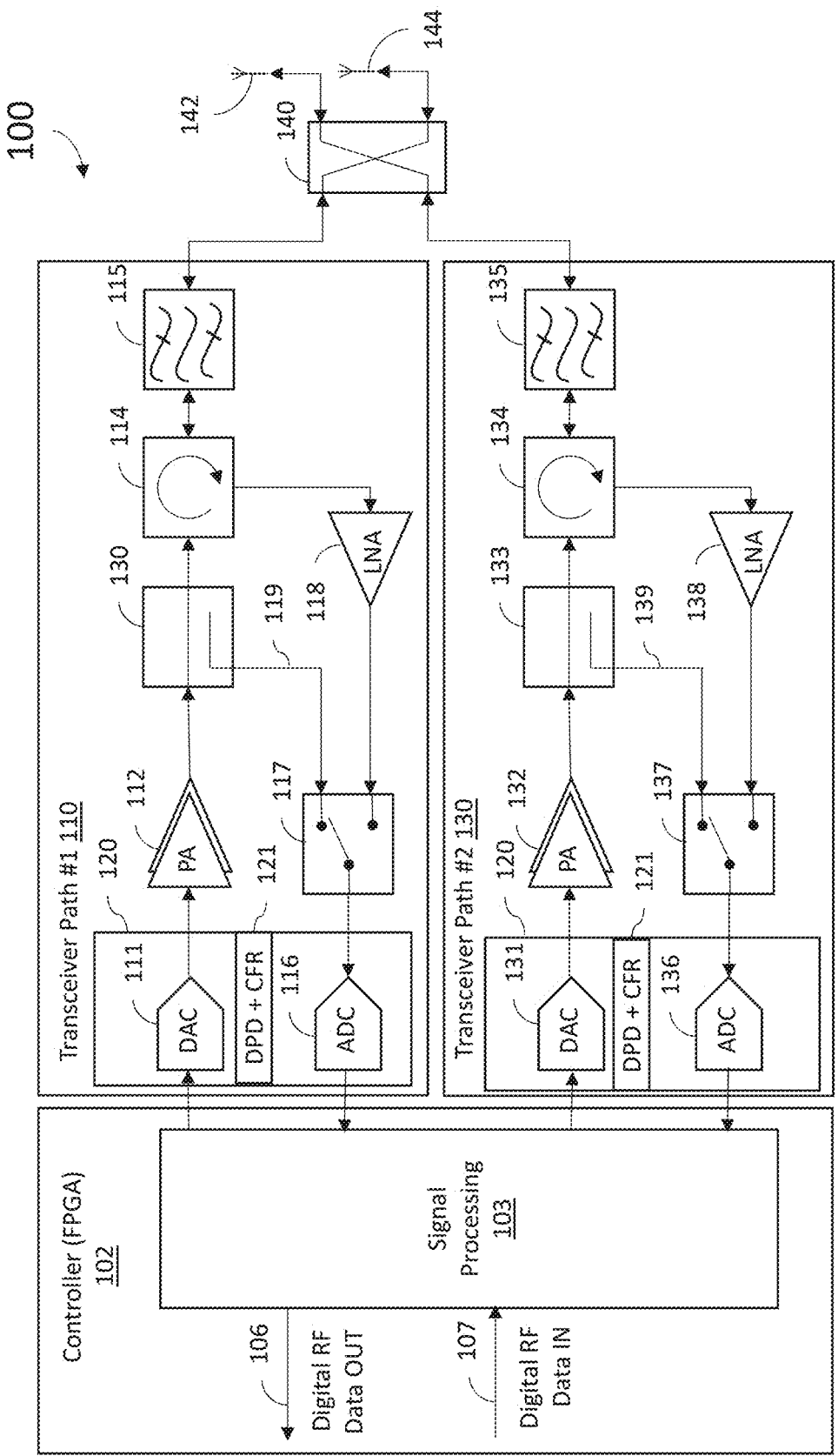
FIG. 2 is a block diagram illustrating an example multi-transceiver radio frequency signal processing system embodiment.

Another alternate transceiver architecture of the first transceiver path 110 and second transceiver path 130 is illustrated in FIG. 2. In this implementation of the MT-SPS 100, the ADC and DAC are realized in integrated transceiver chips 120 that also comprises integrated DPD cores+CFR engines 121 that perform the same functions of DPD core 104 and CFR engine 105 discussed throughout this disclosure. As mentioned above, a configuration having a dedicated analog-to-digital converter for the receive path, separate from the analog-to-digital converter of the integrated transceiver chips for the observation feedback path, can also be implemented. In some embodiments, any combination of the DACs, the receive path ADCs and/or the observation ADCs disclosed herein may be combined together and implemented on a single integrated circuit chip.

As mentioned above, the concept of dividing a larger frequency band between the frequency blocks of two or more transceiver paths introduces border frequencies, the existence of which can complicate both the execution of DPD across the larger frequency band and cause severe Error Vector Magnitude (EVM) degradations, especially for "cross border" carriers. In other words, if the spectrum of a carrier overlaps the border frequency so that the channel falls partially into both frequency blocks, then the phase and amplitude misalignment of the two transporting paths 110, 130 can cause severe EVM degradations of the complete recombined carrier.

Figure 3:
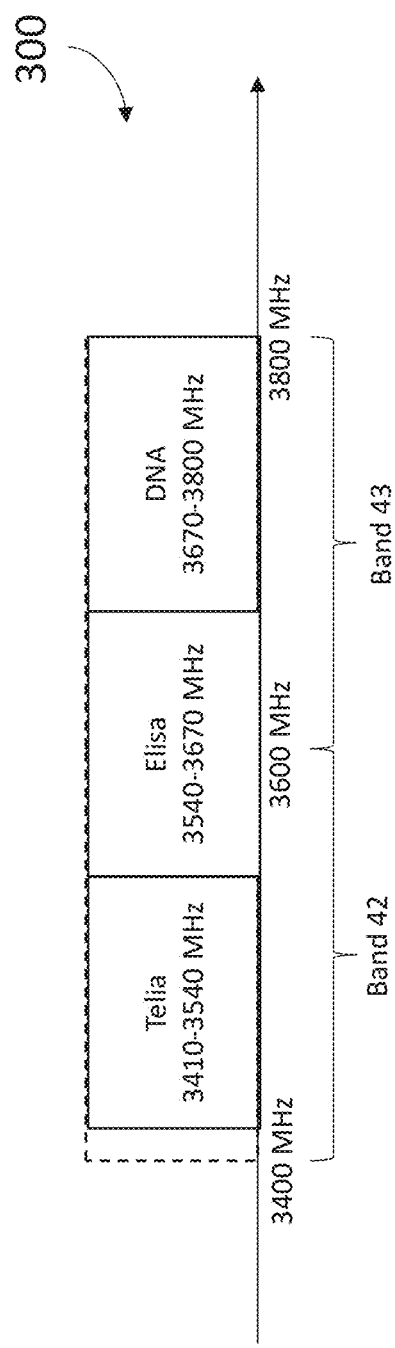
FIG. 3 is a diagram illustrating an example frequency allocation.

FIG. 3 is a diagram illustrating an example frequency allocation 300 resulting with a system operator having a cross border carrier. In this example, a spectrum auction in Finland yielded the frequency allocation that divides the Band 42 and Band 43 between three mobile operators, Telia, Elisa and DNA. While the spectrum (3410-3540 MHz) allocated to Telia fits within Band 42, and the spectrum (3670-3800 MHz) allocated to DNA fits within Band 43, the spectrum (3540-3670 MHz) allocated to Elisa straddles across Band 42 and 43 and the border frequency of 3600 MHz. If the MT-SPS 100 is configured so that the transceiver path 110 covers 3400-3600 MHz, and the transceiver path 130 covers 3600-3800 MHz, then the carriers of Elisa are "cross border" carriers, with portions of those signals being transported by different ones of the transceiver paths 110, 130. The border frequency of 3600 MHz falls squarely in the signal spectrum so that any phase and amplitude misalignment between transceiver paths 110 and 130 will directly impact the ability of the MT-SPS 100 to accurately transport Elisa's signal. Given the stringent requirements on composite EVM for QAM256 signals and the degradation of EVM caused by a repeater system or DAS in general, any additional degradation can be detrimental to the feasibility for the whole system's design. In a worst-case scenario, a "cross border" LTE or 5G signal can be fully corrupted. In such a case the composite EVM is completely degraded.

In some embodiments, mitigating the phase and amplitude misalignment at the border frequency between the first transceiver path 110 and the second transceiver path 130 can be achieved by shifting the bandwidth settings for the two paths. That is, the first transceiver path and the second transceiver path have adjustable bandwidth settings to shift a frequency location of the border frequency. For example, the biggest 5G NR carrier in the sub-6 GHz frequency domain is 100 MHz and it could be considered that the worst-case scenario is where this carrier center frequency is directly on the border frequency. In order to mitigate phase and amplitude misalignment by shifting the bandwidths, each frequency block is able to shift its respective border frequency edge by enough to place the signal fully within one of the paths (for example, by 50 MHz for the 100 MHz carrier). That is, given a 100 MHz 5G NR carrier for Europe to a center frequency of 3600 MHz, either the bandwidth of first transceiver path 110 needs to be adjusted to cover 3400 MHz to 3650 MHz (thus shifting the border frequency to 3650 MHz) or the bandwidth of second transceiver path 130 needs to be adjusted to cover 3550 MHz to 3800 MHz (thus shifting the border frequency to 3550 MHz) so that the entirety of the 100 MHz 5G NR carrier falls within the frequency block of one of the two transceiver paths 110 or 130. This would eliminate the occurrence of an amplitude and phase misalignment contributing to EVM and place the entire signal within the spectrum of a single inverse model for the purpose of DPD. It should be noted that the filters 115, 135 for each of the transceiver paths 110 or 130 would also either be adjustable or otherwise have an overlapping region of 100 MHz. It should be understood that application of bandwidth shifting for a 100 MHz 5G NR carrier is for example purposes and that this concept can be equally applied to carriers of other frequencies and bandwidths (for example, it can be applied to millimeter wave signals where the maximum bandwidth of a carrier can be up to 400 MHz). This concept of flexible bandwidth of transceivers path is extendable to any plurality of two or more transceiver paths.

In other embodiments, mitigating the phase and amplitude misalignment at the border frequency between the first transceiver path 110 and the second transceiver path 130 can be achieved by amplitude and phase calibration of both frequency paths in both the receiving (RX) and transmitting (TX) directions. With such calibration, the complete bandwidth across both frequency paths can be supported without restrictions as to where carrier signals are positioned. For example the first transceiver path 110 and the second transceiver path 130 can be calibrated by utilizing continuous wave (CW) tones of the same center frequency applied to the transceiver paths. The transceiver paths are calibrated to approximately obtain a predetermined maximum phase difference (for example, a predetermined maximum phase difference of +/−20°) between the CW tones at the border frequency as measured from the two transceiver paths. The amplitudes of both CW tones as applied to the transceiver paths may be approximately the same, but need not be identical. The phase and amplitude calibration of different transceivers as described herein can be extended to any plurality of two or more transceiver paths.

There are several possibilities to achieve good phase and amplitude calibration including in-production calibration techniques and in-field calibration techniques.

During in-production calibration, the phase and the amplitude are calibrated at a production test bench. Deterministic latency exists within the transceiver paths from the signal processing 103 output of the controller 102 to the output of the DAC, and from the input of the ADC to the input of the controller 102. It should be noted that in some embodiments, the MT-SPS 100 complies with the JESD204X standard for which deterministic latency is a feature (the JESD204X standard defines that latency is deterministic when the time from the input of a JESD204x transmitter to the output of the JESD240x receiver is consistently the same number of clock cycles). In some embodiments, the DAC and/or ADC are used with a deterministic interface such as a low-voltage differential signaling (LVDS) interface. Moreover, analog RF components of the transceiver paths between the DAC and the antenna, and between antenna and ADC, can be considered deterministic.

To calibrate the first transceiver path 110 and the second transceiver path 130 to minimize amplitude and phase imbalance, the respective DAC 111 and DAC 131 are operated by the controller 102 to send out a CW tone at the border frequency, so that both CW tones have the same frequency. A test device is used, which allows a technician to combine and superpose respectively both CW tones. In one embodiment, the combined analog output can be measured with a spectrum analyzer. In another embodiment, a power meter for measuring the combined analog output can be used instead if there are no other signals on the antenna connector, i.e. are fed to the power meter. Selecting either the first transceiver path 110 or the second transceiver path 130, the phase and the amplitude of the transmit path is adjusted based on a power measurement of the combined signal. In one embodiment, the phase and the amplitude of the transmit path is adjusted until the combined measured analog signal shows a minimum level, ideally being completely annihilated. This condition of a minimum signal level represents an amplitude ratio between the two transmit paths of 1:1 and a phase difference of 180°. It should be understood that the term "at a minimum" as used here and elsewhere in this disclosure does not imply an absolute minimum is achieved. Instead, a minimum may be obtained by an approximate minimum that achieves mitigation of the misalignments enough to accurately transport signals. Adjusting one of the transmit paths to remove the 180° phase difference will give a phase relation of 0° between the two transmit paths. To achieve a normalized amplitude of close to 1, the edge of the filtering should roll off such that the composite normalized gain of the two transmit paths is equal to 1. For instance, Normalized Gain$_{path1}$(border freq+freq)+Normalized Gain$_{path2}$(border freq+freq)=1. The adjustments to phase and amplitude can be performed either in the digital domain by the controller 102, or by using a phase shifter and controllable attenuator in the analog path of one or both of the first transceiver path 110 and the second transceiver path 130. In alternate embodiments, the phase and the amplitude of the transmit path may be adjusted until the combined measured analog signal instead shows a maximum level, though using the minimum level is more selective, resulting in a more accurate number.

Figure 4:
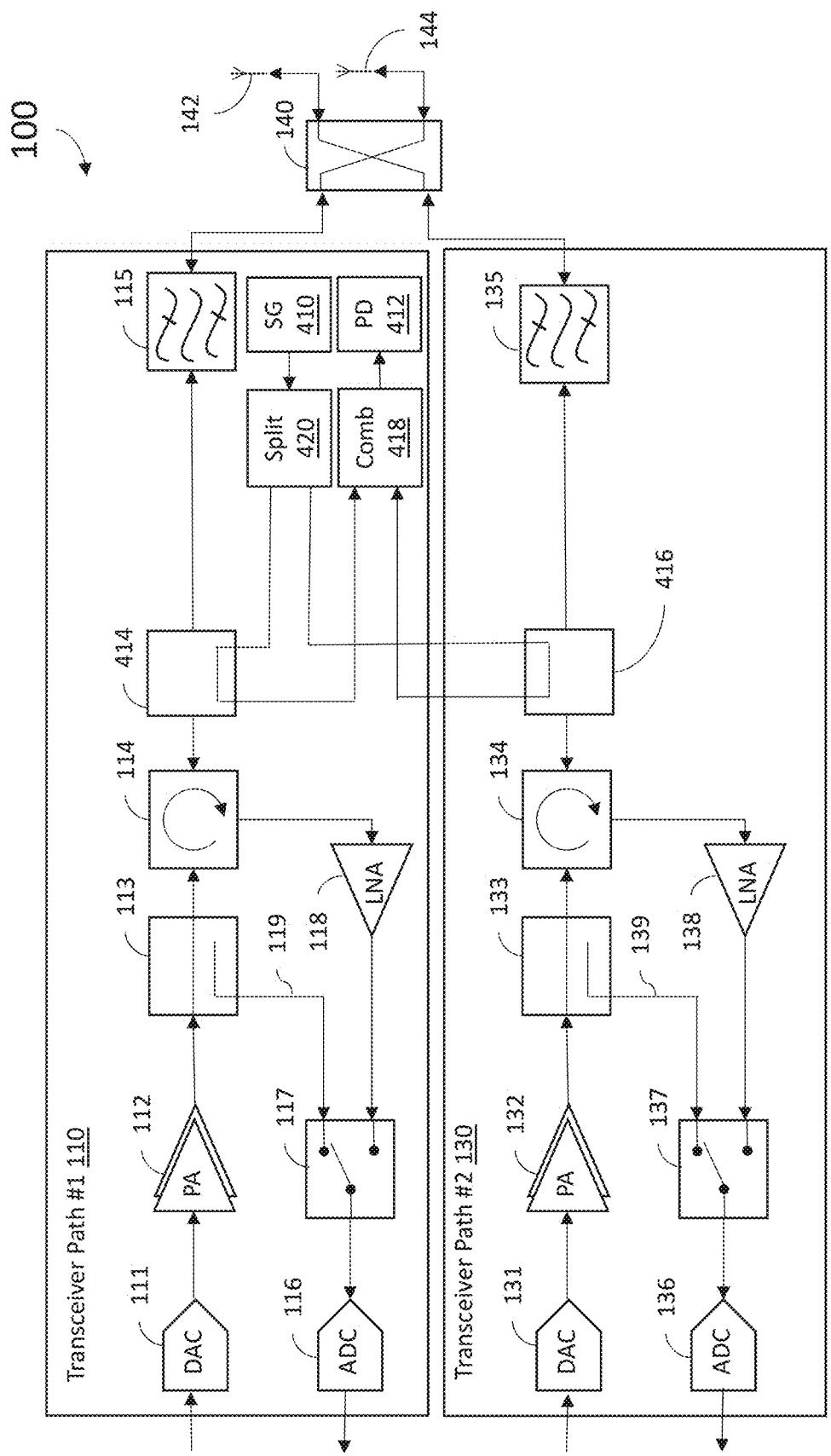
FIG. 4 is a block diagram illustrating an example multi-transceiver radio frequency signal processing system embodiment with in-field calibration features.

With in-field calibration, the phase and the amplitude can be calibrated after equipment deployment and/or as part of the equipment boot-up process. Therefore, deterministic latency is not of concern since this calibration is done after each reboot and re-initialization of the DAC and ADC of the transceiver paths. As shown in FIG. 4, to support in-field calibration, the first transceiver path 110 and the second transceiver path 130 are augmented with additional calibration hardware. This calibration hardware comprises a signal generator (SG) 410 configured to output a CW tone at the border frequency, a power detector (PD) 412, a first directional coupler 414 in the signal path of the first transceiver path 110, a second directional coupler 416 in the signal path of the second transceiver path 130, a 2-way 0° combiner 418, and a 2-way splitter 420.

To calibrate the transmit paths, both of the DACs 111 and 131 are controlled by the controller 102 to generate CW tones at the border frequency, having the same frequency. In the first transceiver path 110, the CW tone signal generated by the DAC 111 is decoupled from the transmit path by the first directional coupler 414. In the second transceiver path 130, the CW tone signal generated by the DAC 131 is decoupled from the transmit path by the second directional coupler 416. The two decoupled signals are combined by the 2-way 0° combiner 418 and the PD 412 measures the power level of the summed signals.

Selecting either the first transceiver path 110 or the second transceiver path 130, the phase and the amplitude of the transmit path is adjusted until the power level of the summed signal (resulting from the superposition of CW1 and CW2 (both having the same frequency)) indicated by the measurement by PD 412 is at an extreme of either a minimum or maximum. A condition of a minimum power level represents an amplitude ratio between the two transmit paths of 1:1 and a phase relation of 180°. Adjusting one of the transmit paths to remove the 180° phase difference will give a phase relation of 0° between the two transmit paths. Note that in some embodiments, the 2-way 0° combiner 418 may instead be a 2-way 90° combiner in which case one of the transmit paths is adjusted remove a 90° phase difference. As such, whether the combiner 418 is, for example a 0° type, a 90° type, or a another type, the phase type of the combiner influences the amount of adjustment to be applied to obtain the phase relation of 0° between the two transmit paths.

To calibrate the receiver paths of the first transceiver path 110 and the second transceiver path 130, SG 410 generates a CW tone at the border frequency that is split by the 2-way splitter 420 and coupled onto the receive path of the first transceiver path 110 by the directional coupler 414 and onto the receive path of the second transceiver path 130 by the directional coupler 416. The CW tone is thus captured as a first digital RX stream by the controller 102 from the first transceiver path 110 via the ADC 116, and captured as a second digital RX stream by the controller 102 from the second transceiver path 130 via the ADC 136, and digitally summed by the controller 102. The phase and amplitude of one of the digital RX streams is then adjusted until the power level of the digitally summed signal as measured by the controller 102 is at an extreme of either a minimum or a maximum. A condition of a minimum power level represents an amplitude ratio between the two transmit paths of 1:1 and a phase relation of 180°. Adjusting one of the receive paths to remove the 180° phase difference will give a phase relation of 0° between the two receive paths to thus phase align the receive paths. Note that in some embodiments, the 2-way 0° combiner 418 may instead be a 2-way 90° combiner in which case one of the transmit paths is adjusted remove a 90° phase difference. As such, whether the combiner 418 is, for example a 0° type, a 90° type, or a another type, the phase type of the combiner influences the amount of adjustment to be applied to obtain the phase relation of 0° between the two receive paths.

To achieve a normalized amplitude of close to 1, the edge of the filtering should roll off such that the composite normalized gain of the two transmit paths is equal to 1. For instance, Normalized Gain$_{path1}$(border freq+freq)+Normalized Gain$_{path2}$(border freq+freq)=1. The adjustments to phase and amplitude can be performed either in the digital domain by the controller 102, or by using a phase shifter and controllable attenuator in the analog path of one or both of the first transceiver path 110 and the second transceiver path 130. Amplitude and phase uncertainty of the additional components of the calibration hardware can be determined and/or corrected by various means. For example, in one embodiment calibration values from an in-production calibration can be compared to an In-Field-calibration. It should be noted that locating the directional couplers 414 and 416 relatively closer to the antenna port will provide better calibration accuracy. It should also be understood that the calibration hardware discussed with respect to FIG. 4 may be included as an option in any of the other embodiments described herein.

In any of the embodiments described herein, the first transceiver path 110 and the second transceiver path 130 may comprise the antenna 142, 144 as internal antenna components. In such embodiments, there may be leakage between the internal antenna of the first transceiver path 110 and the internal antenna of the second transceiver path 130. Another method for in-field calibration to phase align transceiver paths can be implemented to allow a wideband channel to span across two transceiver paths by the following self-calibration procedure. In this procedure, phase and amplitude offsets between the two paths are determined. Then a complex scalar is applied to the one of the paths to compensate for the amplitude and phase difference between the two transceiver paths 110, 130.

To perform the transmit path calibration, in the first transceiver path 110, a known signal (i.e., of known amplitude and phase) is generated by the DAC 111 at the border frequency (e.g. 3600 MHz) and transmitted from the first transceiver path 110 via an internal antenna coupled to the first transceiver path 110. The transmitted known signal is received by another internal antenna coupled to the receive path of the first transceiver path 110. The amplitude and phase difference between the known signal and the signal as received and converted by the ADC 116 is measured by the controller 102. In the second transceiver path 130, the same known signal is generated by the DAC 131 at the border frequency and this second version of the known signal is transmitted from the second transceiver path 130 via an internal antenna coupled to the second transceiver path 130. The transmitted second version of the known signal is received by an internal antenna coupled to the receive path of the first transceiver path 110. The phase relationships and amplitude relationships (e.g. amplitude and phase difference) between the second version of known signal and the signal as received and converted by the ADC 116 is measured. From these two difference measurements, a phase and gain difference between the first transceiver path 110 transmit path and the second transceiver path 130 transmit path are calculated. Then, gain and phase compensation is applied to one of the transmit paths so the phases are aligned.

In some embodiments, a first CW tone is transmitted by the digital-to-analog converter of the first transceiver path 110 and a second CW tone of the same frequency is transmitted by the digital-to-analog converter of the second transceiver path 130 at the border frequency. The first and second CW tones are received by the internal antenna coupled to the receive path of the first transceiver path 110 where they are superimposed and either the first or second transceiver path is adjusted until a power level of the combined (superimposed) signal is either a minimum or maximum. The phase difference of the first and second transceiver paths is adjusted to align the phase relation between the first transceiver path and the second transceiver path (for example, reduce the difference in phase relation towards 0°). This may involve adjusting a phase of the receive path of either the first transceiver path or the second transceiver path by 180°.

Alternatively, the controller 102 may be programmed to determine phase relationships (e.g., the phases and phase differences) of the first and second CW tones respectively, and amplitude relationships (e.g., the amplitudes and amplitude difference) of the first and second CW tones respectively. The controller 102 then utilizes these measurements directly so that determinations of a power level maximum or minimum and the corresponding adjustments are not needed. For example, each of the CW tones can be measured consecutively and the phases/phase differences and amplitudes/amplitude differences are measured explicitly by the controller 102. The phase difference of the first and second transceiver paths is then adjusted to align the phase relation between the first transceiver path and the second transceiver path (for example, reduce the difference in phase relation towards 0°).

To perform the receive path calibration, in the first transceiver path 110, a known signal (e.g., a CW tone of known amplitude and phase) is generated by the DAC 111 at the border frequency (e.g. 3600 MHz) and transmitted from the first transceiver path 110 via an internal antenna coupled to the first transceiver path 110. The transmitted known signal is received by an internal antenna coupled to the receive path of the first transceiver path 110, and by an internal antenna coupled to the receive path of the second transceiver path 130.

The amplitude and phase difference between the known signal and the signal as received and converted by the ADC 116 is measured by the controller 102. The amplitude and phase difference between the known signal and the signal as received and converted by the ADC 136 is measured by the controller 102. From these two difference measurements, a phase and gain difference between the first transceiver path 110 receive path and the second transceiver path 130 receive path are calculated (for example, in the same manner as explained above to the transceiver paths). For example, in one embodiment the CW tone as received by the internal antenna coupled to the receive path of the first transceiver path 110, and as received by the internal antenna coupled to the receive path of the second transceiver path 130 can be superimposed and either the first or second transceiver path is adjusted until a power level of the combined (superimposed) signal is either a minimum or maximum. Alternatively, the controller 102 may be programmed to determine phase relationships and amplitude relationships of the CW tones as received from the receive path of the first transceiver path 110 and the receive path of the second transceiver path 130 respectively. Then, gain and/or phase compensation is applied to one of the receive paths so the phases are aligned.

As already discussed above, DPD is a technique that may be utilized to obtain energy efficient transceiver designs by addressing power amplifier non-linearities. As will now be described, there a several ways to implement DPD.

It may be noted that the embodiments shown in FIGS. 1, 2 and 4 each illustrate post-filter combining of the signal paths of the first transceiver path 110 and the second transceiver path 130. In these post-filter-combining architectures, each filter 115, 135 supports the frequency band of the dedicated frequency block for its respective transceiver path. This means that the return loss of each filter in the passband at the border frequency is poor. That is, the return loss of filter 115 is poor in the passband of transceiver path #2 130 and return loss of filter 135 is poor in the passband of transceiver path #1 110. This causes a misalignment between hybrid coupler 140 and each of the filters 115, 135. The benefit of post-filter-combining is that the complete combined output power provided by both PA 112 and PA 132 is available at the output ports of the hybrid 140 to be radiated by the antenna 142, 144. The drawback of this option is that if only one antenna is needed in the installation, the second port of the hybrid 140 will be coupled to a termination device (such as a resistive termination load), and half of the power generated by PA 112 and PA 132 will be dissipated at that termination device. One potential post-filter-combining variant includes embodiments that utilize the combination of both bands by a frequency combiner. The benefit of post-filter-frequency combining is that the complete output power generated by PA 112 and PA 132 is available on one antenna port. The drawback is that if two bands (Such as band 42 and band 43, for example) are combined in this frequency selective manner, the combining would result in a high insertion loss within a small frequency range at the border frequency, which would make this part of the spectrum unusable.

Figure 5:
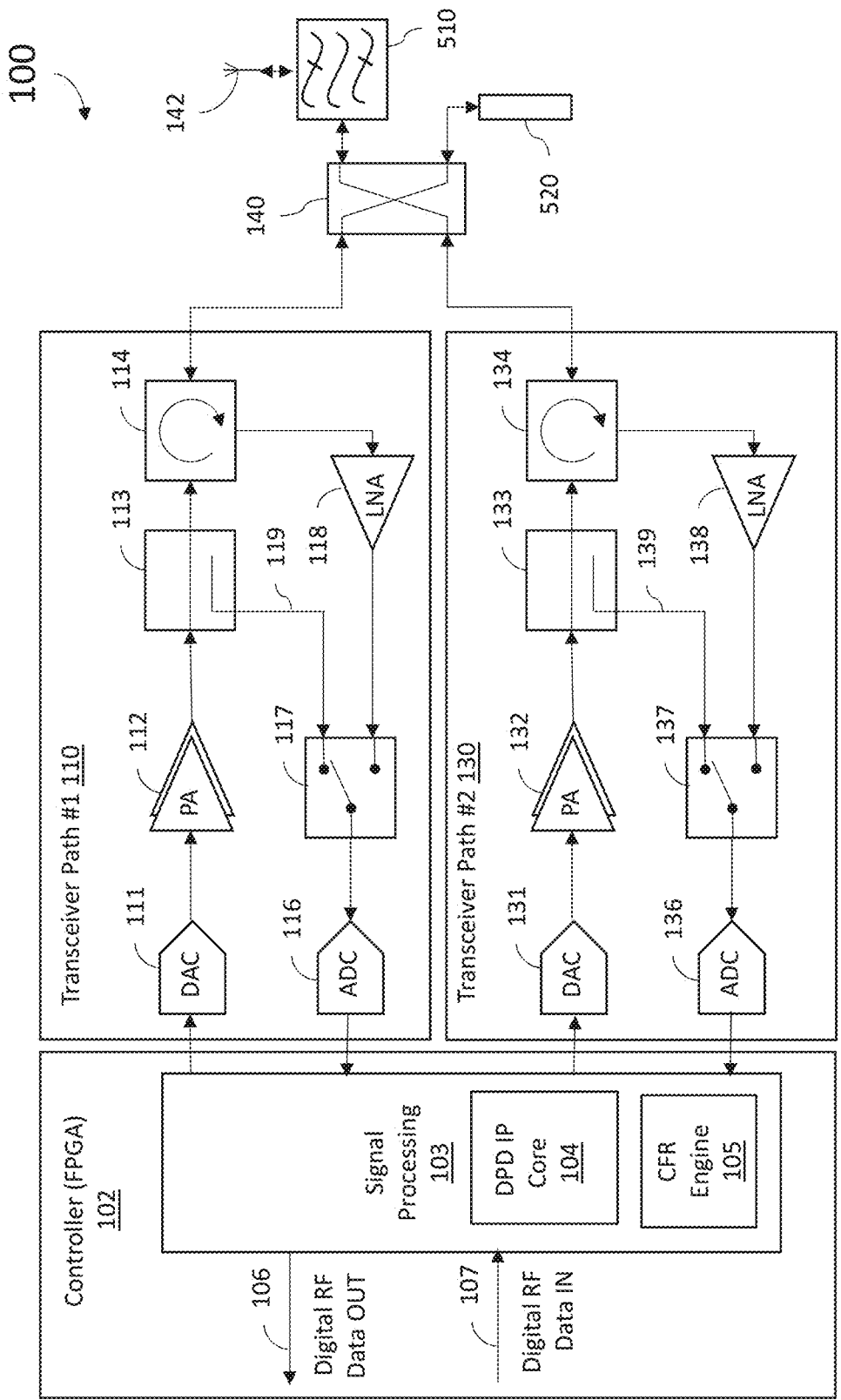
FIG. 5 is a block diagram illustrating an example multi-transceiver radio frequency signal processing system embodiment with pre-filter combining.

An alternative to post-filter-combining is pre-filter combining as illustrated by FIG. 5. With pre-filter combining, only a single filter which supports the frequency bands of both frequency blocks is needed. For example, as shown in FIG. 5, the filters 115 and 135 are omitted from the first transceiver path 110 and the second transceiver path 130 and the isolators 114 and 134 are instead coupled to the ports of the hybrid 140 without those filters intervening. A filter 510 is instead coupled between the antenna 142 and the hybrid 140, the filter 510 being configured to pass the combined frequency blocks of the first transceiver path 110 and the second transceiver path 130 and filter out components of signals falling outside the combined frequency blocks. The benefit of the pre-filter-combining as illustrated in FIG. 5 is that the return losses on each port of the hybrid in the operating band is good so that there are no misalignments introduced between the isolator devices 114, 134, the hybrid 140 and the filter 510. A drawback of this architecture is that half of the power generated by PA 112 and by PA 132 will be dissipated in a termination device 520 (such as a resistive termination load) used to terminate the unused port of the hybrid 140. This drawback could be overcome by replacing the termination device by a second filter plus antenna. In this case the only drawback compared to post-filter combining is the fact that the bandwidth of the filter in pre-filter combining is the double and therefore cost will be higher.

Another issue to be noted with pre-filter combining architectures is the alignment of the DPD correction bandwidth. In post-filter combining each filter 115 and 135 will additionally suppress distortion caused by the PA 112 and PA 132 outside of correction bandwidth available from the DPD core 104. In contrast, with pre-filter combining the DPD correction bandwidth applied is as broad as the bandwidth of the filter 510. Moreover, the state of the art in terms of correction bandwidth is currently up to about 500 MHz and a DPD correction bandwidth is symmetric to the center of the corrected frequency band.

Figure 6:
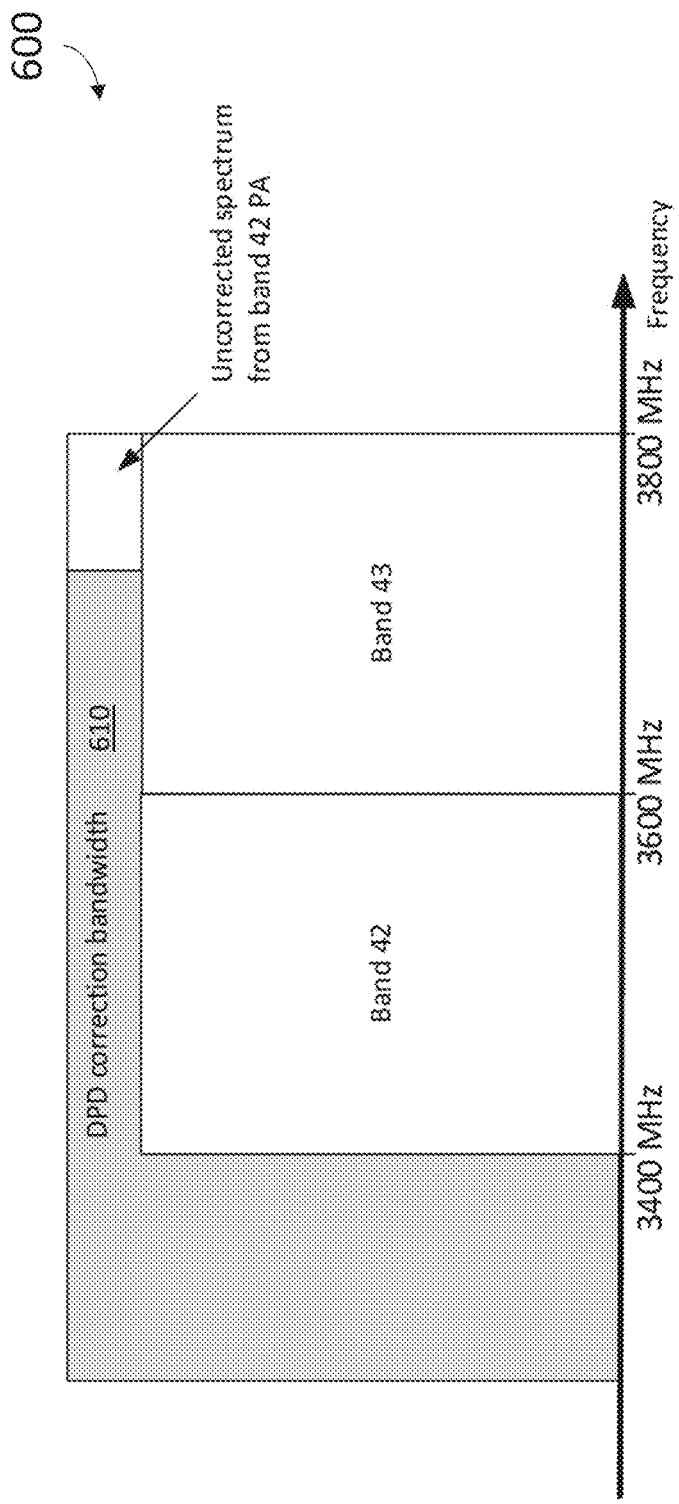
FIG. 6 is a diagram illustrating a digital pre-distortion symmetric correction bandwidth.
Figure 7:
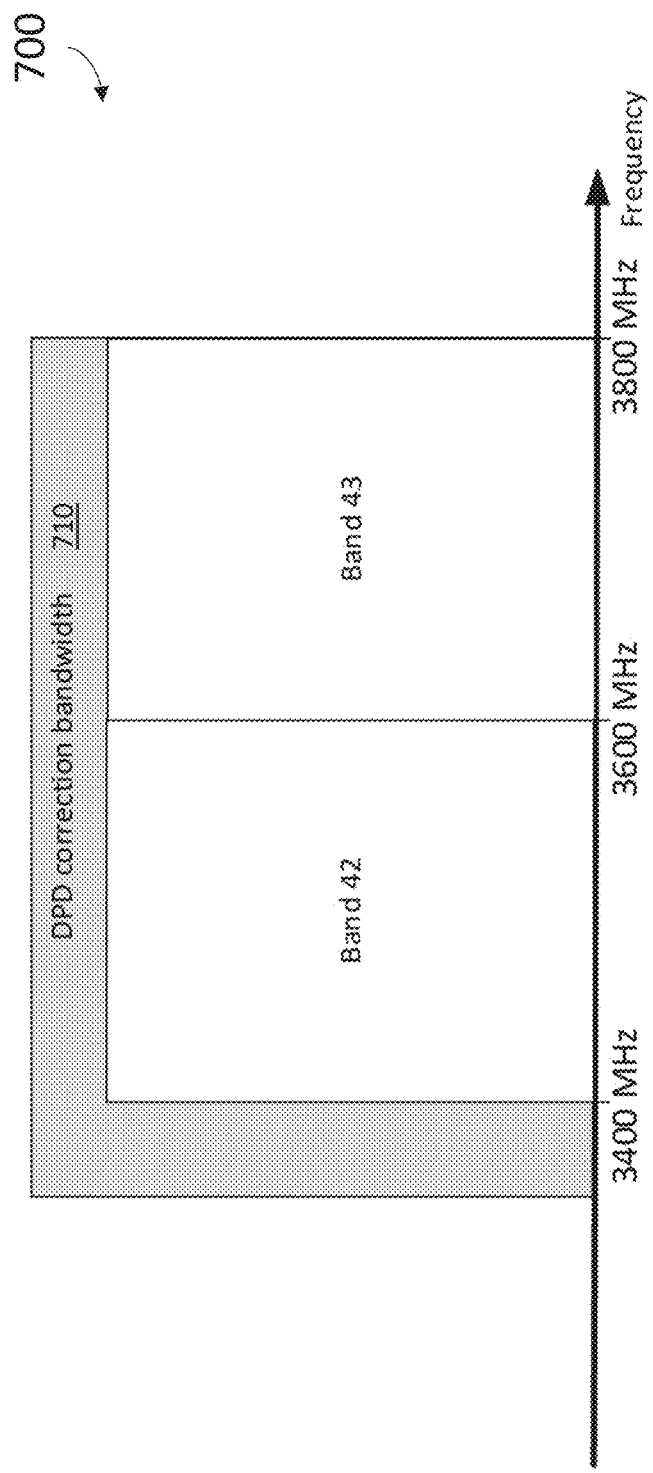
FIG. 7 is a diagram illustrating a digital pre-distortion asymmetric correction bandwidth.

For example, FIG. 6 illustrates at 600 a symmetric correction bandwidth 610 (of 450 MHz) applied to Band 42 (3400 MHz-3600 MHz). When such a DPD symmetric correction bandwidth 610 is applied in a pre-filter combining architecture (such as in FIG. 5, for example), the result applies distortions to correct non-linearities of the PA for Band 42, but also results in the production of DPD distortions to just a portion of the Band 43 spectrum, thus potentially causing a violation of the 3GPP specifications. In one embodiment, a solution for this problem is that DPD IP Core 104 implements an asymmetric DPD bandwidth. Such an embodiment is shown in the diagram 700 of FIG. 7, where a DPD correction bandwidth 710 of 450 MHz is applied over the entirety of Band 42 and Band 43. See for example, U.S. Pat. No. 10,615,754 "METHODS AND APPARATUSES FOR DIGITAL PRE-DISTORTION" dated Apr. 7, 2020, which is incorporated herein by reference in its entirety.

In another embodiment, an efficient DPD implementation utilizes a single PA with the DPD IP core executing two asymmetrical DPD engines and observation feedback cancelation.

Figure 8:
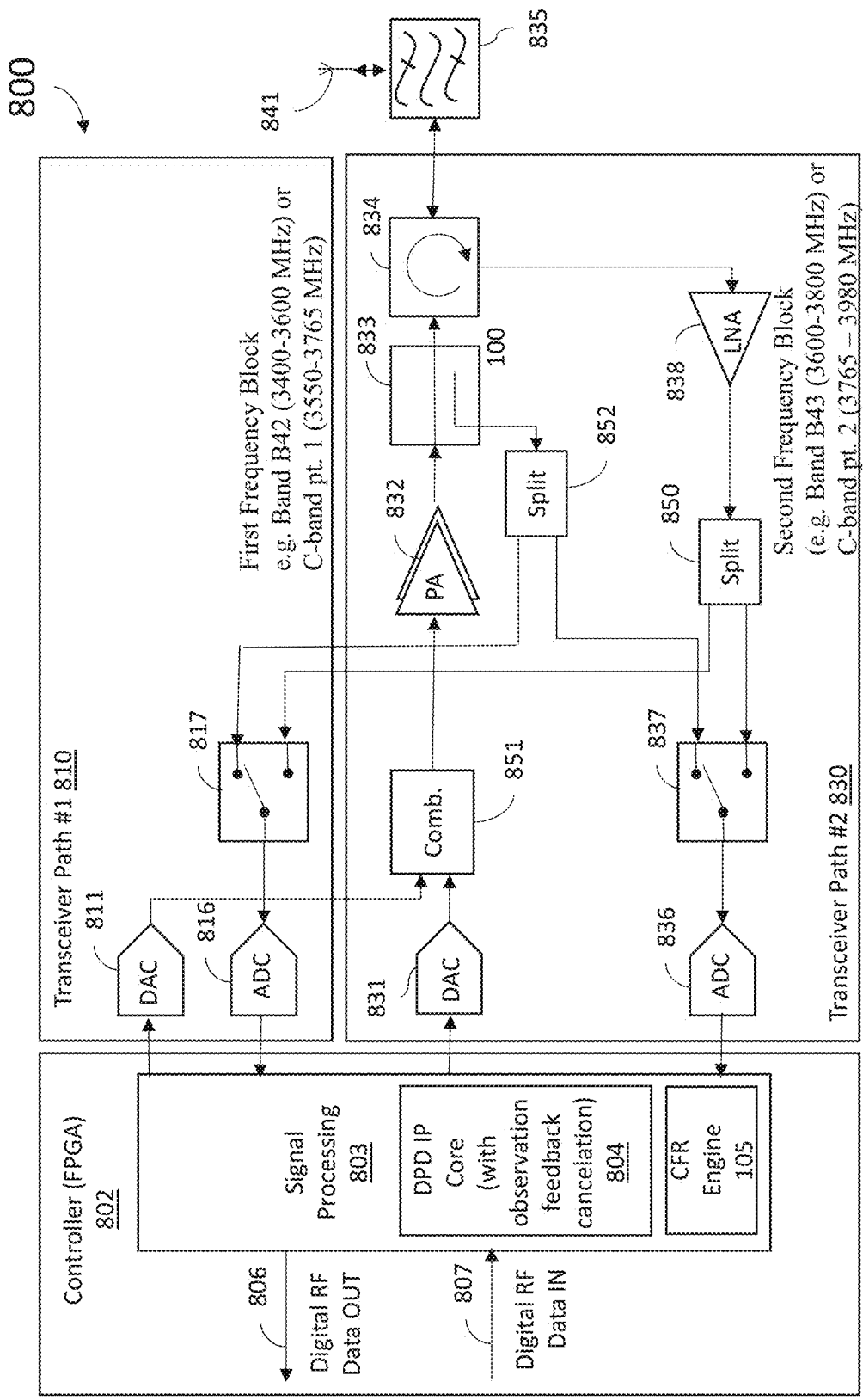
FIG. 8 is a block diagram illustrating an example single power amplifier multi-transceiver radio frequency signal processing system embodiment with pre-filter combining.

Such an embodiment is illustrated by the MT-SPS 800 shown in FIG. 8. It should be understood that the MT-SPS 800 is an implementation of the MT-SPS 100 and may include any of the alternate features of MT-SPS 100 discussed herein.

In the embodiment shown in FIG. 8, the MT-SPS 800 comprises a first transceiver path 810 and a second transceiver path 830, each coupled to a controller 802 executing signal processing 803 and a DPD IP core 804 that incorporates observation feedback cancelation. The first transceiver path 810 and the second transceiver path 830 operate in parallel to provide a unified signal path for transporting signals falling within a contiguous spectrum of RF signal bandwidths. That is, the first transceiver path 810 is configured to process a first frequency block while the second transceiver path 830 is configured to process a second frequency block that is adjacent to the first frequency block.

In one example embodiment, the first transceiver path 810 transports the European 3GPP 200 MHz band B42 (3400-3600 MHz) and the second transceiver path 830 transports the European 3GPP 200 MHz band B43 (3600-3800 MHz). The combined signal carrying bandwidth this MT-SPS 800 is therefore a 400 MHz band from 3400-3800 MHz, with a border frequency of 3600 MHz that falls within the operating band of both the first transceiver path 810 and the second transceiver path 830. In another example embodiment, the first transceiver path 810 and the second transceiver path 830 each carry adjacent portions of an RF band. For example, in the United States, the Citizens Broadband Radio Service (CBRS) C-band operates from 3550-3980 Mhz. In that case the first transceiver path 810 may transport a first part of the C-band (e.g., 3550-3765 MHz) while the second transceiver path 830 transports an adjacent second part of the C-band (e.g. 3765-3980 MHz). The combined signal path of this MT-SPS 800 would be a 430 MHz band from 3550-3980 MHz, with a border frequency of 3765 MHz that falls within the operating band of both the first transceiver path 810 and the second transceiver path 830.

For the MT-SPS 800 of FIG. 8, the first transceiver path 810 comprises a transmit path that includes a digital-to-analog converter 811, and a receive path that includes an analog-to-digital converter 816, and an RF switch 817. The second transceiver path 830 comprises a transmit path that includes a digital-to-analog converter 831, a power amplifier 832, a signal coupler 833, a signal isolator 834 (such as a 3-port circulator, for example) and an RF band filter 835. The second transceiver path 830 also comprises a receive path that includes an analog-to-digital converter 836, an RF switch 837 and a low noise amplifier 838 that is coupled to the signal isolator 834. The signal isolator 834 is coupled to one or more antennas 841. The signal isolator 834 passes RF signals from the transmit path of the second transceiver path 830 to the one or more antenna 841 for wireless transmission, and passes wireless RF signals received by the one or more antenna 841 to the receive path of the second transceiver path 830, while providing isolation (i.e., a high degree of attenuation) that attenuates signals passing between the transmit path and the receive path. The antenna 841 is coupled to the isolator 834 via the filter 835, which is configured to filter out components of signals falling outside the combined frequency blocks of the first and second transceiver paths, 810 and 830.

In receiving mode operation, the signal isolator 834 passes wireless RF signals received by the one or more antenna 841 to the LNA 838. The resulting amplified signal is passed to a splitter 850 that distributes the signal to the RF switch 817 and RF switch 837. In receive mode, the RF switch 817 and RF switch 837 are switched to couple the LNA 838 output to the ADC 816 and the ADC 836, respectively. The resulting amplified signal is digitized by the ADC 816 and ADC 836 into digital RF signals for input to the controller 802, processed by the signal processing 803 and output from the controller as digital RF data 806.

In transmitting mode operation, the controller 802 receives digital RF data input 807, which is processed by the signal processing 803. The controller 802 outputs a first portion corresponding to the first frequency block as a first digital RF signal to the DAC 811, which converts the digital RF signal to a first analog RF signal. The controller 802 outputs a second portion corresponding to the second frequency block as a second digital RF signal to the DAC 831, which converts the digital RF signal to a second analog RF signal. The first and second analog RF signals are summed by a combiner 851 and the resulting analog signal is provided to the PA 832. The PA 832 amplifies the analog signal to a power level for transmission and the signal isolator 834 passes the signal for wireless transmission by the one or more antenna 841 (via the filter 835).

The signal coupler 833 couples a portion of the transmitted signal as amplified by the PA 832 back to the ADC 816 and ADC 836 for conversion into a digital observation feedback signal for input to the controller 802. Here, the RF switches 817 and 837 are switched to align the ADC 816 and ADC 836 to the signal coupler 833 via a splitter 852. This alignment provides the observation feedback path for performing DPD. To utilize the observation feedback additional cancelation functions are implemented in the DPD IP core 804 which digitally remove the transmitted signal of DAC 831 that passes through PA 832 from the observation feedback received on ADC 816. In the same way, the DPD IP core 804 applies cancelation functions which digitally remove the transmitted signal of DAC 811 that passes through PA 832 from the observation feedback received on ADC 836. In this way, the signal of DAC 811 only gets distortion applied based on the distortion of the DAC 811, PA 832 combination, and the signal of DAC 831 only gets distortion applied based on the distortion of the DAC 831, PA 832 combination.

In some embodiments, during system start-up or as a one-time process during production the path between DAC 811 and PA 832 to ADC 836, and vice versa DAC 831 and PA 832 to ADC 816, can be calibrated. During this calibration routine the phase and amplitude relation between the digital transmit signal (as sent by the DAC 811 or DAC 831) and the resulting observation feedback signal (as captured respectively by ADC 836 and ADC 816) over frequency is recorded. During this calibration process, when one DAC is outputting the calibration transmit signal, the unused DAC is switched off. The resulting recording defines a channel model from DAC 811 with the whole RF lineup to ADC 836 with phase and amplitude information over frequency, and also from DAC 831 with the whole RF lineup to ADC 816 with phase and amplitude information over frequency. Correcting the phase of the recording by 180° will cancel the transmit signal from DAC 811 from the feedback of ADC 836, and cancel the transmit signal from DAC 831 from the feedback of ADC 816, and therefore implement independent DPD functionality over each of the frequency blocks.

FIGS. 9, 9A, 9B and 9C each illustrate example embodiments of a distributed antenna system (DAS) 900 comprising a DAS master unit 910 coupled to a plurality of remote antenna units 920, and further comprising one or more MT-SPS such as MT-SPS 100, 800 as disclosed above. The master unit 910 is configured to receive downlink radio frequency signals from one or more base stations 905. These signals may also be referred to as "base station downlink signals." Each base station downlink signal includes one or more radio frequency channels used for communicating in the downlink direction with user devices 901 over a relevant wireless air interface. In the uplink direction, DAS 900 is configured to receive respective uplink radio frequency signals from the user equipment 901 within the coverage area 903 of the DAS 900, and transport those signals as "base station uplink signals" to the base stations 905.

Figure 9:
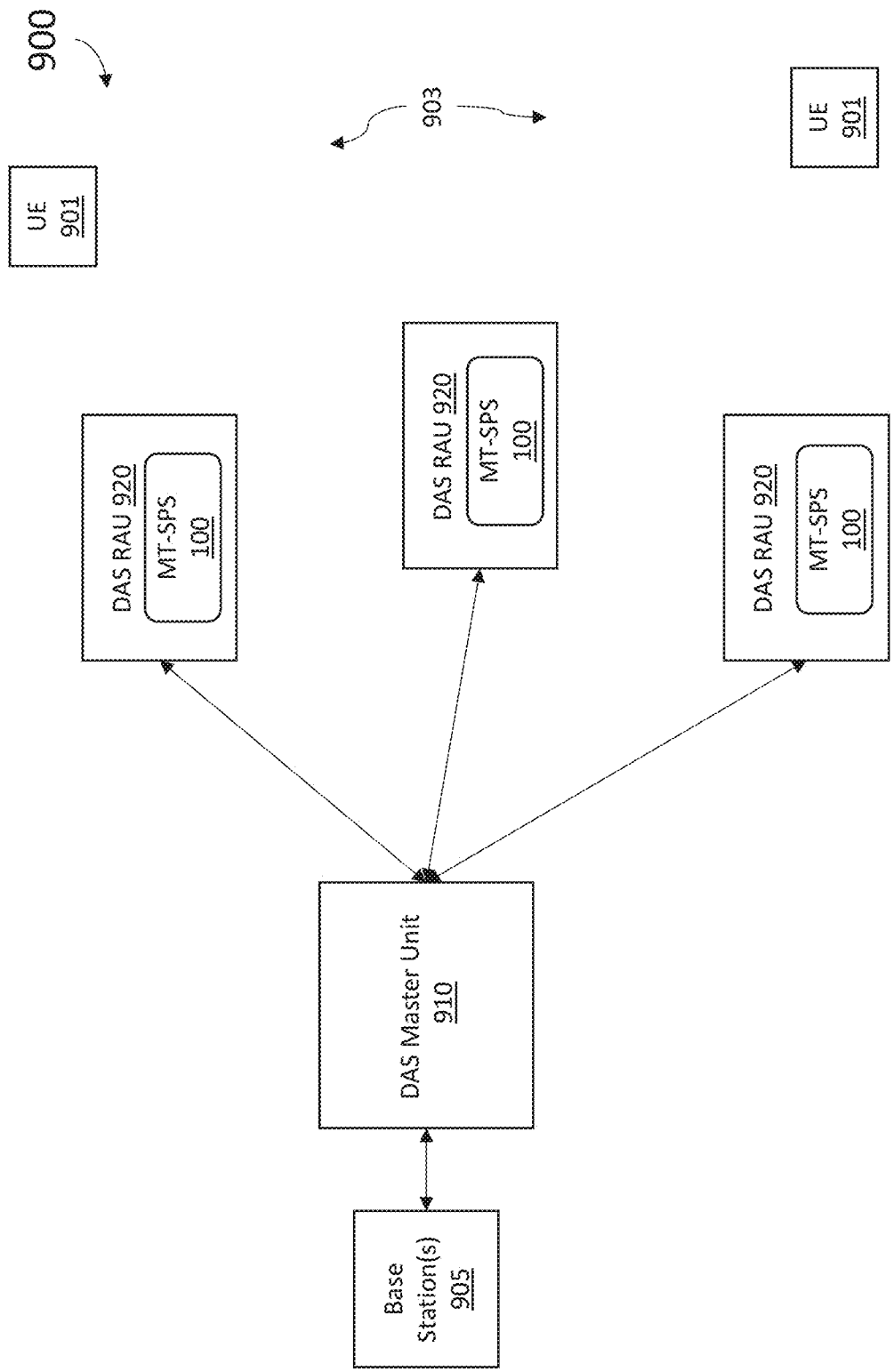
Figure 9A:
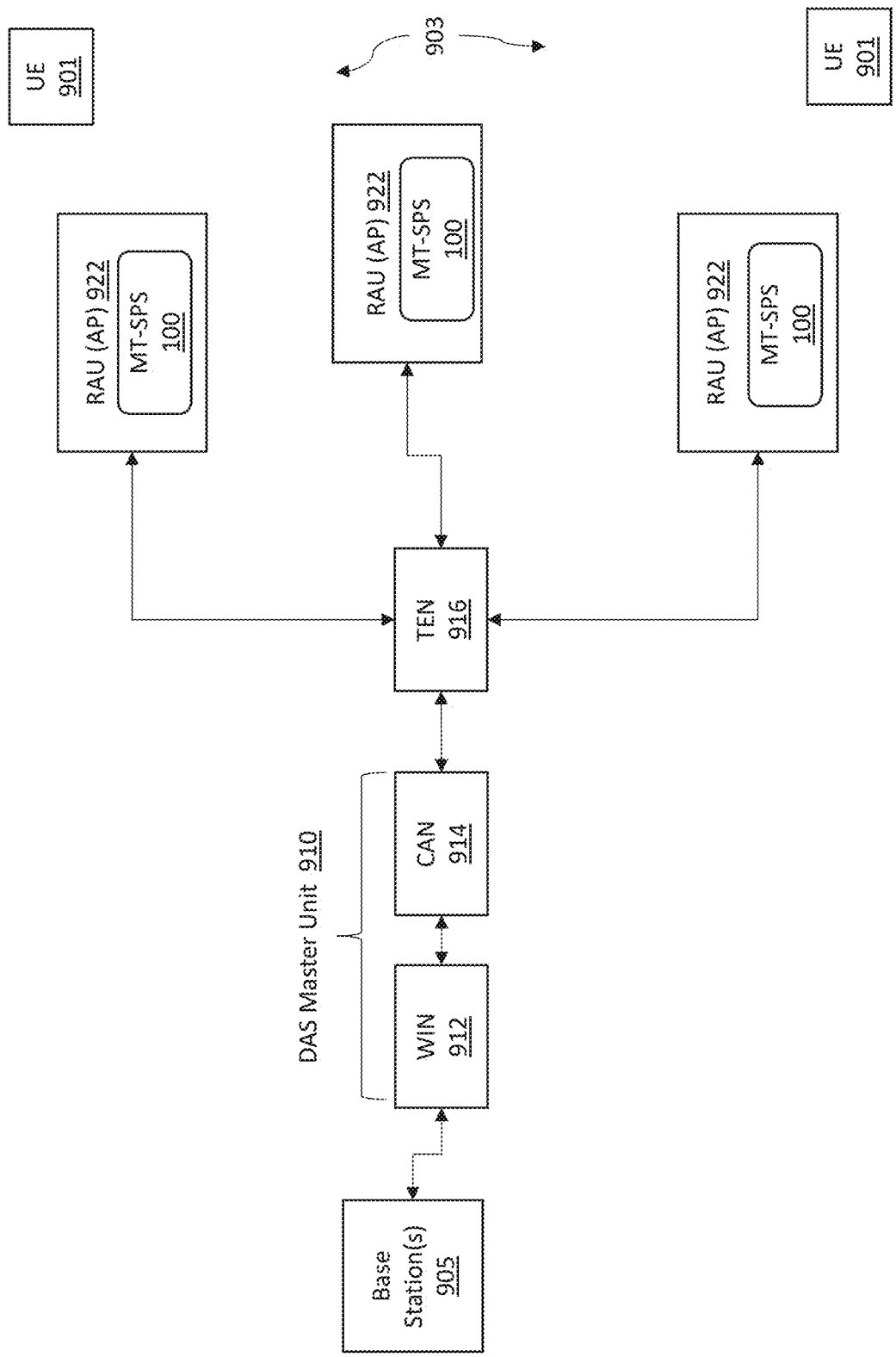

Typically, each base station downlink signal is received at the master unit 910 from the one or more base stations 905 as analog radio frequency (RF) signals, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, Open Radio Access Network ("O-RAN") protocol, or other protocol). The base station downlink signals may be digitized or otherwise formatted by the master unit 910 into a digital signal, and the resulting downlink transport signal transported to the remote antenna unit 920, which radiate the downlink transport signals as wireless RF signals to user equipment 901 (UE, such as tablets or cellular telephone, for example) in the coverage area 903 of the DAS 900. In the uplink direction, a remote antenna unit 920 receives uplink RF signals from the user equipment 901, which may be digitized or otherwise formatted by the remote antenna unit 920 into a digital signal and the resulting uplink transport signal transported to the master unit 910 for transmission to the base station 905 as a base station uplink signal. In some embodiments, the DAS 900 may be implemented as illustrated in FIG. 9A where the DAS comprises a wide-area integration node (WIN) 912, a central area node (CAN) 914, a transport extension node (TEN) 916, and a plurality of wireless access points 922. The WIN 912 and CAN 914 operate in conjunction with each other to implement the DAS master unit 910 that establishes communications with the one or more base stations 905. In this DAS architecture, the plurality of access points 922 define the remote antenna units 920 of the DAS 900 which establish wireless connectivity with the user equipment 901 located within the coverage area 903.

Figure 9B:
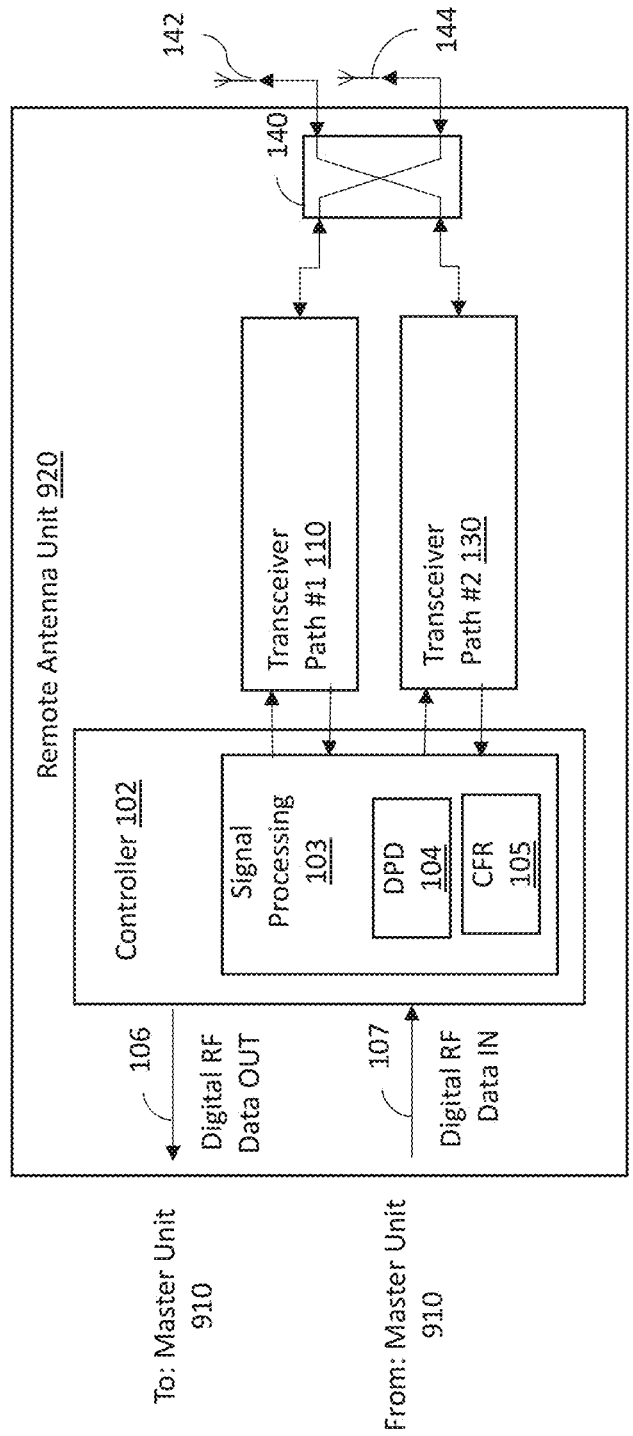

As shown in FIG. 9B, the MT-SPS 100 described herein are implemented in one or more of the remote antenna units 920. Here, the first coverage transceiver path 110 and the second coverage transceiver path 130 each operate over a respective first and second frequency block to provide connectivity services from the base stations 905 to the UE 901 over frequency bands and channels falling within the combined frequency blocks of the two transceiver paths in any of the manners described herein. The controller 102 executing the signal processing 103 and DPD IP core 104 may comprise the controller of the RAU 920, or be implemented by separate controller or FPGA. Here, the digital RF data output 106 comprises the uplink transport signals which are transmitted to the DAS master unit 910 for transport to the base station 905, and the digital RF input 107 comprises the downlink transport signals received from the DAS master unit 910 for wireless transmission by the antenna 142, 144 into the coverage area 903.

Figure 9C:
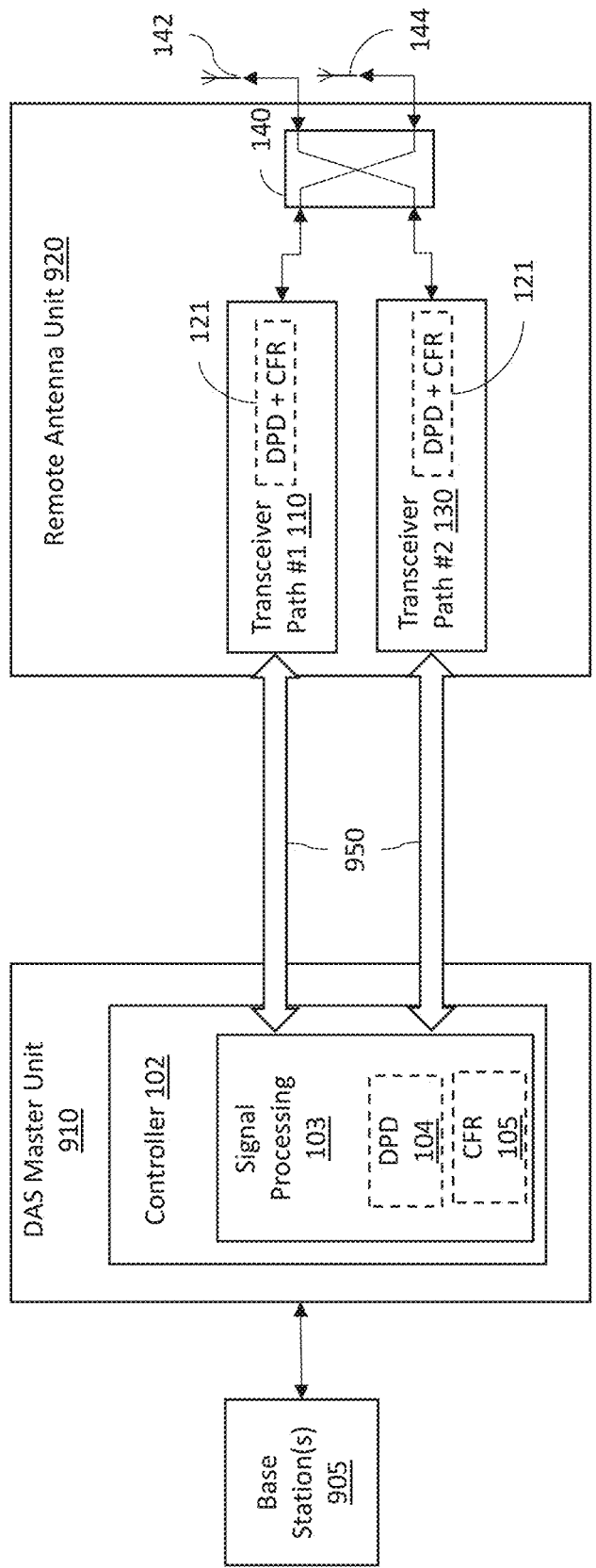

As an alternate implementation, in some embodiments of the DAS 900, the functions attributed to the controller 102 may instead be executed in the DAS master unit (910) (e.g. the WIN 912 or CAN 914) as illustrated in FIG. 9C. The controller 102 executing the signal processing 103 and DPD IP core 104 may comprise the controller of the DAS master unit 910, or be implemented by separate controller or FPGA. Here, the digital transmit signals and the digital receive signals communicated between the signal processing 103 and DPD IP core 104 in the DAS master unit 910, and the transceiver paths 110, 130 in the RAU 920 may be carried by digital data links 950 established between the DAS master unit 910 and the RAU 920. In some embodiments, the digital data links 950 may be established, for example, via a wired or wireless Ethernet connection, over an IP network, or using another protocol.

Alternatively, one or more of the signal processing 103 functions attributed to the controller 102 may be executed in the DAS master unit (910), with integrated transceiver chips 120 having DPD core and CFR engine functions 121 (as previously shown in FIG. 2) in the remote unit 920. This latter embodiment, keeping the DPD core and CFR engine functions 121 at the Remote Antenna Unit 920, would avoid higher data rates between DAS Master Unit 910 and Remote Antenna Unit 920.

FIGS. 10 and 10A each illustrate example embodiments of an off-air repeater system 1010 comprising one or more MT-SPS such as MT-SPS 100, 800 as disclosed above. The repeater system 1010 comprises one or more donor antenna 1052, 1054 for communication with at least one base station 1005, and one or more coverage antenna 1042, 1044 for communication with one or more UE 1001 within a coverage area 1003 of the repeater system 1010. In operation, the repeater system 1010 functions to extend a coverage area of the base station 1005 for providing communications services into the coverage area 1003 by repeating wireless uplink and downlink RF signals between the base station 1005 and the UE 1001.

The repeater system 1010 comprises a version of the MT-SPS 100 further configured for use in a repeater architecture as shown by the MT-SPS 1500 in FIG. 10A. In this embodiment, the MT-SPS 1500 comprises a set of coverage transceiver paths 1020 each of which may be configured in any of the ways described above with respect to the transceiver paths of MT-SPS 100. The MT-SPS 1500 also comprises a set of donor transceiver paths 1030 each of which may be also configured in any of the ways described above with respect to the transceiver paths of MT-SPS 100. The coverage transceiver paths 1020 are coupled to the one or more coverage antenna 1042, 1044 by hybrid 1040, and the donor transceiver paths 1030 are coupled to the one or more donor antenna 1052, 1054 by hybrid 1050. Although the coverage transceiver paths 1020 are illustrated as comprising two coverage transceiver paths (1022 and 1024) and the donor transceiver paths 1030 are illustrated as comprising two donor transceiver paths (1032 and 1034), they are not so limited and in other embodiments may each respectively comprise more than two such paths.

As illustrated in FIG. 10A, the coverage transceiver paths 1020 and donor transceiver paths 1030 are each coupled in a symmetrical manner to the controller 102 which executes the signal processing 103 and DPD IP core 104. Generally speaking, the coverage transceiver paths 1020 operate in conjunction with the controller 102 to transmit and receive RF signals in the same manner as described with respect to MT-SPS 100, directed towards sending and receiving RF signals from the coverage side of repeater system 1010. As such the coverage transceiver paths 1020 may be configured and calibrated with respect to phase and amplitude at its border frequency to transport signals and apply DPD in the same manner as described with respect to MT-SPS 100. Likewise, the donor transceiver paths 1030 operate in conjunction with the controller to transmit and receive RF signals in the same manner as described with respect to MT-SPS 100, directed towards sending and receiving RF signals from the donor side of repeater system 1010. As such the donor transceiver paths 1020 may be configured and calibrated with respect to phase and amplitude at its border frequency to transport signals and apply DPD in the same manner as described with respect to MT-SPS 100. Further, in such embodiments, the digital RF data output 106 produced by the signal processing 103 from uplink RF signals received from the coverage transceiver paths 1020 form the basis of the digital RF data input 107 to be transmitted by the donor transceiver paths 1030. Likewise, in such embodiments, the digital RF data output 106 produced by the signal processing 103 from downlink RF signals received from the donor transceiver paths 1030 form the basis of the digital RF data input 107 to be transmitted by the coverage transceiver paths 1020.

EXAMPLE EMBODIMENTS

Example 1 includes a multi-transceiver radio frequency (RF) signal processing system, the system comprising: a controller configured to execute signal processing for multiple transceiver paths; a digital pre-distortion (DPD) core and crest factor reduction (CFR) engine; and a plurality of transceiver paths coupled to the controller, the plurality of transceiver paths comprising at least a first transceiver path for a first frequency block, and a second transceiver path for a second frequency block, wherein the first frequency block is adjacent to the second frequency block at a border frequency; wherein the signal processing executed by the controller is configured to output a stream of digital RF data based on wireless RF signals received into the first transceiver path and into the second transceiver path; wherein the signal processing executed by the controller is configured to input a first stream of digital RF data and output a first digital RF signal corresponding to the first frequency block to the first transceiver path for wireless transmission via at least one antenna, and output a second digital RF signal corresponding to the second frequency block to the second transceiver path for wireless transmission via the at least one antenna; and wherein the DPD core applies a distortion to the first digital RF signal and the second digital RF signal that covers the first frequency block and the second frequency block.

Example 2 includes the system of Example 1, wherein the first transceiver path and the second transceiver path have adjustable bandwidth settings to shift a frequency location of the border frequency.

Example 3 includes the system of any of Examples 1-2, wherein the first transceiver path and the second transceiver path are calibrated to align in phase and amplitude at the border frequency.

Example 4 includes the system of any of Examples 1-3, wherein the DPD core is implemented at least in part by a first integrated transceiver chip in the first transceiver path, and a second integrated transceiver chip in the second transceiver path, or by an integrated transceiver chip having multiple inputs and outputs.

Example 5 includes the system of any of Examples 1-4, wherein the DPD core comprises an inverse model of nonlinear transfer characteristics of a respective power amplifier for each of the plurality of transceiver paths.

Example 6 includes the system of Example 5, wherein at least one of the first transceiver path or the second transceiver path comprises a receive path configured to provide an observation feedback path to the digital pre-distortion (DPD) core.

Example 7 includes the system of Example 6, wherein the DPD core adjusts the inverse model of the nonlinear transfer characteristics of the respective power amplifier for each of the plurality of transceiver paths based on the observation feedback path.

Example 8 includes the system of any of Examples 1-7, wherein the first transceiver path and the second transceiver path are coupled to the at least one antenna by a hybrid.

Example 9 includes the system of Example 8, wherein the first transceiver path comprises a first filter having a passband corresponding to the first frequency block and the first transceiver path is coupled to the hybrid via the first filter; wherein the second transceiver path comprises a second filter having a passband corresponding to the second frequency block and the second transceiver path is coupled to the hybrid via the second filter.

Example 10 includes the system of any of Examples 8-9, wherein the hybrid is coupled to the at least one antenna by a filter having a passband corresponding to the first frequency block and second frequency block.

Example 11 includes the system of any of Examples 1-10, wherein the first transceiver path comprises a first digital-to-analog converter configured to convert the first digital RF signal to a first analog RF signal; wherein the second transceiver path comprises a second digital-to-analog converter configured to convert the second digital RF signal to a second analog RF signal; wherein the first analog RF signal and the second analog RF signal are summed by a combiner and a resulting analog signal provided to a power amplifier, and wherein the DPD core is configured with observation feedback cancelation that digitally cancels the second analog RF signal from an observation feedback received from the first transceiver path, and digitally cancels the first analog RF signal from an observation feedback received from the second transceiver path.

Example 12 includes the system of any of Examples 1-11, wherein the plurality of transceiver paths comprise calibration hardware for calibrating the first transceiver path and the second transceiver path to align in phase and amplitude at the border frequency; the calibration hardware comprising: a first directional coupler in the first transceiver path; a second directional coupler in the second transceiver path, a combiner coupled to a power detector; and a splitter coupled to a signal generator; wherein the combiner is configured to produce a summed signal from a first tone received from the first directional coupler and a second tone received from the second directional coupler and the power detector is configured to measure a power level of the summed signal, wherein the controller is configured to calibrate transmit paths of the first transceiver path and second transceiver path based on a measurement of the power level; and wherein the signal generator is configured to transmit, via the splitter, a third tone into the first directional coupler and the second directional coupler, wherein the controller is configured to calibrate receive paths of the first transceiver path and second transceiver path based on a measurement of the power level of a digitally summed signal of the third tone as received by the controller from the first transceiver path and as received from the second transceiver path.

Example 13 includes a distributed antenna system (DAS) that includes a DAS master unit coupled to a plurality of DAS remote antenna units, wherein the DAS master unit is configured to receive downlink radio frequency signals from at least one base station and transmit base station uplink signals to the at least one base station, wherein the remote antenna units each are configured to receive a downlink transport signal from the DAS master unit and radiate the downlink transport signals as wireless RF signals to user equipment in a coverage area of the DAS, and wherein the remote antenna units each are configured to send an uplink transport signal to the DAS master unit, the uplink transport signal based on uplink RF signals received from the user equipment, the DAS comprising the multi-transceiver RF signal processing system of Example 1.

Example 14 includes the DAS of Example 13, wherein the uplink transport signal comprises the stream of digital RF data output from the signal processing; wherein the downlink transport signal comprises the first stream of digital RF data input to the signal processing.

Example 15 includes the DAS of any of Examples 13-14, wherein one or more of the plurality of DAS remote antenna units respectively implement the multi-transceiver RF signal processing system.

Example 16 includes the DAS of any of Examples 13-15, wherein one or more of the plurality of DAS remote antenna units respectively implement the plurality of transceiver paths; wherein the controller of the multi-transceiver RF signal processing system is implemented in the DAS master unit.

Example 17 includes an off-air repeater system comprising one or more of the multi-transceiver RF signal processing system of Example 1.

Example 18 includes the off-air repeater system of Example 17, wherein the plurality of transceiver paths comprises: a set of donor transceiver paths coupled to one or more donor antenna; and a set of coverage transceiver paths coupled to one or more coverage antenna.

Example 19 includes a method for calibrating phase and amplitude alignment for a multi-transceiver radio frequency (RF) signal processing system that includes a plurality of transceiver paths coupled to a controller, the plurality of transceiver paths comprising at least a first transceiver path for a first frequency block, and a second transceiver path for a second frequency block, wherein the first frequency block is adjacent to the second frequency block at a border frequency, the method comprising: transmitting through the first transceiver path and the second transceiver path a continuous wave (CW) tone with a same frequency at the border frequency; measuring a power level of a combined signal, the combined signal generated by a superposition of a first analog output from the first transceiver path and a second analog output from the second transceiver path; adjusting one or both of a phase and an amplitude of a transmit path of either the first transceiver path or the second transceiver path until the power level of the combined signal is either a minimum or a maximum; and adjusting a phase of the transmit path of either the first transceiver path or the second transceiver path to align a phase relation between the first transceiver path and the second transceiver path.

Example 20 includes the method of Example 19, wherein adjusting the phase of the transmit path comprising digitally adjusting a phase value in the controller.

Example 21 includes the method of any of Examples 19-20, wherein adjusting the phase of the transmit path comprises digitally adjusting a phase shifter or controllable attenuator in the transmit path.

Example 22 includes the method of any of Examples 19-21, wherein adjusting the phase of the transmit path comprises one or more analog adjustments in the transmit path.

Example 23 includes a method for transmit path calibration of phase and amplitude alignment for a multi-transceiver radio frequency (RF) signal processing system that includes a plurality of transceiver paths coupled to a controller, the plurality of transceiver paths comprising at least a first transceiver path for a first frequency block, and a second transceiver path for a second frequency block, wherein the first frequency block is adjacent to the second frequency block at a border frequency, the method comprising: with the controller, controlling a digital-to-analog converter of the first transceiver path to generate a first continuous wave (CW) tone at the border frequency, and controlling a digital-to-analog converter of the second transceiver path to generate a second CW tone at the border frequency, both the first and second CW tones having the same frequency; decoupling the first CW tone from a transmit path of the first transceiver path and decoupling the second CW tone from a transmit path of the second transceiver path; with a combiner, producing a summed CW signal by summing the decoupled first CW tone and the decoupled second CW tone; measuring a power level of the summed CW signal; adjusting one or both of a phase or an amplitude of the transmit path of one either the first transceiver path or the second transceiver path until the power level of the summed CW signal is either a minimum or maximum; and adjusting a phase of the transmit path of either the first transceiver path or the second transceiver path by a quantity based at least in part on a phase shift of the combiner and whether the summed CW signal is at minimum or maximum.

Example 24 includes a method for receive path calibration of phase and amplitude alignment for a multi-transceiver radio frequency (RF) signal processing system that includes a plurality of transceiver paths coupled to a controller, the plurality of transceiver paths comprising at least a first transceiver path for a first frequency block, and a second transceiver path for a second frequency block, wherein the first frequency block is adjacent to the second frequency block at a border frequency, the method comprising: with a signal generator coupled to a splitter, generating a continuous wave (CW) tone at the border frequency and coupling the CW tone into a receive path of the first transceiver path and a receive path of the second transceiver path; capturing at the controller a first digital receive stream from the first transceiver path and a second digital receive stream from the second transceiver path; digitally summing the first digital receive stream and the second digital receive stream with the controller to produce a summed CW signal; adjusting either a phase or an amplitude of the receive path of the first transceiver path or the second transceiver path until a power level of the summed CW signal is either a minimum or maximum; and adjusting a phase of the receive path of either the first transceiver path or the second transceiver path by a quantity based at least in part on whether the summed CW signal is at minimum or maximum.

Example 25 includes the method of Example 24, further comprising: measuring and adding a phase and amplitude of the first digital receive stream and the second digital receive stream; and correcting a difference of one or both of the receive path of the first transceiver path or the receive path of the second transceiver path either at the controller or via an adjustable attenuator and adjustable phase shifter.

Example 26 includes a method for transmit path calibration of phase and amplitude alignment for a multi-transceiver radio frequency (RF) signal processing system that includes a plurality of transceiver paths coupled to a controller, the plurality of transceiver paths comprising at least a first transceiver path for a first frequency block, and a second transceiver path for a second frequency block, wherein the first frequency block is adjacent to the second frequency block at a border frequency, the method comprising: with the controller, controlling a digital-to-analog converter of the first transceiver path to transmit a first continuous wave (CW) tone at the border frequency from a first internal antenna of the first transceiver path, and controlling a digital-to-analog converter of the second transceiver path to transmit a second CW tone at the border frequency from a second internal antenna of the second transceiver path; receiving the first CW tone and the second CW tone at a third antenna coupled to a receive path of one of the plurality of transceiver paths; determining, with the controller, one or more phase relationships and amplitude relationships based on the first CW tone and the second CW tone; adjusting a phase of a transmit path of either the first transceiver path or the second transceiver path to align a phase relation between the first transceiver path and the second transceiver path.

Example 27 includes the method of Example 26 further comprising: superimposing the first CW tone and the second CW tone to determine the one or more phase relationships and amplitude relationships based on either a minimum or a maximum power level.

Example 28 includes the method of Example 26 further comprising: determining with the controller the one or more phase relationships and amplitude relationships by determining phases and phase differences of the first and second CW tones respectively, and amplitudes and amplitude difference of the first and second CW tones respectively.

Example 29 includes a method for receive path calibration of phase and amplitude alignment for a multi-transceiver radio frequency (RF) signal processing system that includes a plurality of transceiver paths coupled to a controller, the plurality of transceiver paths comprising at least a first transceiver path for a first frequency block, and a second transceiver path for a second frequency block, wherein the first frequency block is adjacent to the second frequency block at a border frequency, the method comprising: with the controller, controlling a digital-to-analog converter of the first transceiver path to transmit a first CW tone at the border frequency from a first internal antenna of the first transceiver path; receiving the first CW tone at a second antenna coupled to a receive path of the first transceiver path, and at a third antenna coupled to a receive path of the second transceiver path; and determining, with the controller, one or more phase relationships and amplitude relationships based on the first CW tone passing the receive path of the first transceiver and the first CW tone passing the receive path of a second transceiver; adjusting a phase of the receive path of either the first transceiver path or the second transceiver path to align the phase relation between the first receive path and the second receive path.

Example 30 includes the method of Example 29, further comprising: superimposing the first CW tone as-received at the controller via the receive path of a first transceiver, and the first CW tone as-received at the controller via the receive path of the second transceiver to determine the one or more phase relationships and amplitude relationships based on either a minimum or a maximum power level.

Example 31 includes the method of Example 29, further comprising: determining with the controller the one or more phase relationships and amplitude relationships by determining phases and phase differences of the first CW tone as-received at the controller via the receive path of the first transceiver, and the first CW tone as-received at the controller via the receive path of the second transceiver, and amplitudes and amplitude differences of the first CW tone as-received at the controller via the receive path of the first transceiver, and the first CW tone as-received at the controller via the receive path of the second transceiver.

In various alternative embodiments, system and/or device elements, method steps, or example implementations described throughout this disclosure (such as any of the transceiver paths, controllers, signal processing, DPD cores, CFR engines, repeater systems, digital antenna systems, base stations, DAS master units, DAS remote antenna units, or any other controllers, filters, amplifiers, switches, splitters, combiners, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, wireless repeater and network related terms such as the transceiver paths, controllers, signal processing, DPD cores, CFR engines, repeater systems, digital antenna systems, base stations, DAS master units, DAS remote antenna units, or any other controllers, filters, amplifiers, switches, splitters, combiners, circuits, or sub-parts thereof, refer to non-generic elements as would recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A multi-transceiver radio frequency (RF) signal processing system, the system comprising:
    a controller configured to execute signal processing for multiple transceiver paths;
    a digital pre-distortion (DPD) core and crest factor reduction (CFR) engine; and
    a plurality of transceiver paths coupled to the controller, the plurality of transceiver paths comprising at least a first transceiver path for a first frequency block, and a second transceiver path for a second frequency block, wherein the first frequency block is adjacent to the second frequency block at a border frequency;
    wherein the signal processing executed by the controller is configured to output a stream of digital RF data based on wireless RF signals received into the first transceiver path and into the second transceiver path;
    wherein the signal processing executed by the controller is configured to input a first stream of digital RF data and output a first digital RF signal corresponding to the first frequency block to the first transceiver path for wireless transmission via at least one antenna, and output a second digital RF signal corresponding to the second frequency block to the second transceiver path for wireless transmission via the at least one antenna; and
    wherein the DPD core applies a distortion to the first digital RF signal and the second digital RF signal that covers the first frequency block and the second frequency block.

2. The system of claim 1, wherein the first transceiver path and the second transceiver path have adjustable bandwidth settings to shift a frequency location of the border frequency.

3. The system of claim 1, wherein the first transceiver path and the second transceiver path are calibrated to align in phase and amplitude at the border frequency.

4. The system of claim 1, wherein the DPD core is implemented at least in part by a first integrated transceiver chip in the first transceiver path, and a second integrated transceiver chip in the second transceiver path, or by an integrated transceiver chip having multiple inputs and outputs.

5. The system of claim 1, wherein the DPD core comprises an inverse model of nonlinear transfer characteristics of a respective power amplifier for each of the plurality of transceiver paths, wherein at least one of the first transceiver path or the second transceiver path comprises a receive path configured to provide an observation feedback path to the DPD core, wherein the DPD core adjusts the inverse model of the nonlinear transfer characteristics of the respective power amplifier for each of the plurality of transceiver paths based on the observation feedback path.

6. The system of claim 1, wherein the first transceiver path and the second transceiver path are coupled to the at least one antenna by a hybrid.

7. The system of claim 6, wherein the first transceiver path comprises a first filter having a passband corresponding to the first frequency block and the first transceiver path is coupled to the hybrid via the first filter;
    wherein the second transceiver path comprises a second filter having a passband corresponding to the second frequency block and the second transceiver path is coupled to the hybrid via the second filter.

8. The system of claim 6, wherein the hybrid is coupled to the at least one antenna by a filter having a passband corresponding to the first frequency block and second frequency block.

9. The system of claim 1, wherein the first transceiver path comprises a first digital-to-analog converter configured to convert the first digital RF signal to a first analog RF signal;
    wherein the second transceiver path comprises a second digital-to-analog converter configured to convert the second digital RF signal to a second analog RF signal;
    wherein the first analog RF signal and the second analog RF signal are summed by a combiner and a resulting analog signal provided to a power amplifier; and
    wherein the DPD core is configured with observation feedback cancelation that digitally cancels the second analog RF signal from an observation feedback received from the first transceiver path, and digitally cancels the first analog RF signal from an observation feedback received from the second transceiver path.

10. The system of claim 1, wherein the plurality of transceiver paths comprise calibration hardware for calibrating the first transceiver path and the second transceiver path to align in phase and amplitude at the border frequency; the calibration hardware comprising:
    a first directional coupler in the first transceiver path;
    a second directional coupler in the second transceiver path,
    a combiner coupled to a power detector; and
    a splitter coupled to a signal generator;
    wherein the combiner is configured to produce a summed signal from a first tone received from the first directional coupler and a second tone received from the second directional coupler and the power detector is configured to measure a power level of the summed signal, wherein the controller is configured to calibrate transmit paths of the first transceiver path and second transceiver path based on a measurement of the power level; and
    wherein the signal generator is configured to transmit, via the splitter, a third tone into the first directional coupler and the second directional coupler, wherein the controller is configured to calibrate receive paths of the first transceiver path and second transceiver path based on a measurement of the power level of a digitally summed signal of the third tone as received by the controller from the first transceiver path and as received from the second transceiver path.

11. A distributed antenna system (DAS) that includes a DAS master unit coupled to a plurality of DAS remote antenna units, wherein the DAS master unit is configured to receive downlink radio frequency signals from at least one base station and transmit base station uplink signals to the at least one base station, wherein the remote antenna units each are configured to receive a downlink transport signal from the DAS master unit and radiate the downlink transport signals as wireless RF signals to user equipment in a coverage area of the DAS, and wherein the remote antenna units each are configured to send an uplink transport signal to the DAS master unit, the uplink transport signal based on uplink RF signals received from the user equipment, the DAS comprising the multi-transceiver RF signal processing system of claim 1.

12. The DAS of claim 11, wherein the uplink transport signal comprises the stream of digital RF data output from the signal processing;
wherein the downlink transport signal comprises the first stream of digital RF data input to the signal processing.

13. The DAS of claim 11, wherein one or more of the plurality of DAS remote antenna units respectively implement the multi-transceiver RF signal processing system.

14. The DAS of claim 11, wherein one or more of the plurality of DAS remote antenna units respectively implement the plurality of transceiver paths;
wherein the controller of the multi-transceiver RF signal processing system is implemented in the DAS master unit.

15. An off-air repeater system comprising one or more of the multi-transceiver RF signal processing system of claim 1, wherein the plurality of transceiver paths comprises;
a set of donor transceiver paths coupled to one or more donor antenna; and
a set of coverage transceiver paths coupled to one or more coverage antenna.

16. A method for calibrating phase and amplitude alignment for a multi-transceiver radio frequency (RF) signal processing system that includes a plurality of transceiver paths coupled to a controller, the plurality of transceiver paths comprising at least a first transceiver path for a first frequency block, and a second transceiver path for a second frequency block, wherein the first frequency block is adjacent to the second frequency block at a border frequency, the method comprising:
transmitting through the first transceiver path and the second transceiver path a continuous wave (CW) tone with a same frequency at the border frequency;
measuring a power level of a combined signal, the combined signal generated by a superposition of a first analog output from the first transceiver path and a second analog output from the second transceiver path;
adjusting one or both of a phase and an amplitude of a transmit path of either the first transceiver path or the second transceiver path until the power level of the combined signal is either a minimum or a maximum; and adjusting a phase of the transmit path of either the first transceiver path or the second transceiver path to align a phase relation between the first transceiver path and the second transceiver path.

17. The method of claim 16, wherein adjusting the phase of the transmit path comprising digitally adjusting a phase value in the controller.

18. The method of claim 16, wherein adjusting the phase of the transmit path comprises digitally adjusting a phase shifter or controllable attenuator in the transmit path.

19. The method of claim 16, wherein adjusting the phase of the transmit path comprises one or more analog adjustments in the transmit path.

20. A method for transmit path calibration of phase and amplitude alignment for a multi-transceiver radio frequency (RF) signal processing system that includes a plurality of transceiver paths coupled to a controller, the plurality of transceiver paths comprising at least a first transceiver path for a first frequency block, and a second transceiver path for a second frequency block, wherein the first frequency block is adjacent to the second frequency block at a border frequency, the method comprising:
with the controller, controlling a digital-to-analog converter of the first transceiver path to generate a first continuous wave (CW) tone at the border frequency, and controlling a digital-to-analog converter of the second transceiver path to generate a second CW tone at the border frequency, both the first and second CW tones having a same frequency;
decoupling the first CW tone from a transmit path of the first transceiver path and decoupling the second CW tone from a transmit path of the second transceiver path;
with a combiner, producing a summed CW signal by summing the decoupled first CW tone and the decoupled second CW tone;
measuring a power level of the summed CW signal;
adjusting one or both of a phase or an amplitude of the transmit path of one either the first transceiver path or the second transceiver path until the power level of the summed CW signal is either a minimum or maximum; and
adjusting a phase of the transmit path of either the first transceiver path or the second transceiver path by a quantity based at least in part on a phase shift of the combiner and whether the summed CW signal is at minimum or maximum.

\* \* \* \* \*